United States Patent
Widmer et al.

(10) Patent No.: US 12,184,087 B2
(45) Date of Patent: Dec. 31, 2024

(54) FOREIGN OBJECT DETECTION USING COMBINED INDUCTIVE AND THERMAL SENSING

(71) Applicant: WiTricity Corporation, Watertown, MA (US)

(72) Inventors: Hans Peter Widmer, Wohlenschwil (CH); Marcel Fischer, Boniswil (CH); Ning Liu, Belmont, MA (US)

(73) Assignee: WiTricity Corporation, Watertown, MA (US)

( * ) Notice: Subject to any disclaimer, the term of this patent is extended or adjusted under 35 U.S.C. 154(b) by 86 days.

(21) Appl. No.: 18/161,396

(22) Filed: Jan. 30, 2023

(65) Prior Publication Data

US 2023/0246488 A1 Aug. 3, 2023

Related U.S. Application Data

(60) Provisional application No. 63/267,532, filed on Feb. 3, 2022.

(51) Int. Cl.
*H02J 50/60* (2016.01)
*B60L 53/12* (2019.01)
(Continued)

(52) U.S. Cl.
CPC ............ *H02J 50/60* (2016.02); *G01K 7/16* (2013.01); *G01V 3/10* (2013.01); *H02J 50/10* (2016.02); *B60L 53/12* (2019.02)

(58) Field of Classification Search
CPC . H02J 50/60; H02J 50/10; G01K 7/16; G01V 3/10; B60L 53/12
See application file for complete search history.

(56) References Cited

U.S. PATENT DOCUMENTS 10,444,394 B2  10/2019  Widmer et al.
11,565,596 B2  1/2023  Widmer
(Continued)

FOREIGN PATENT DOCUMENTS

CN  104040834  9/2014
CN  107112814  8/2017
(Continued)

OTHER PUBLICATIONS

"Notice of Allowance", U.S. Appl. No. 18/069,656, Nov. 22, 2023, 8 pages.
(Continued)

*Primary Examiner* — Jared Fureman
*Assistant Examiner* — Duc M Pham
(74) *Attorney, Agent, or Firm* — Colby Nipper PLLC

(57) ABSTRACT

A method for detecting a foreign metal object near an inductive wireless power transfer system is based on combined inductive sensing and thermal sensing. A sensing system senses the object based on an inductive or thermal effect. The sensing system includes a sense element which has an electrical characteristic that changes in a presence of the object based on the inductive effect. A mediating heat-sensitive material has a property that varies as a function of temperature and changes the electrical characteristic of the sense element as the property changes. The mediating heat-sensitive material is heated by the foreign object when the foreign object is heated by a magnetic field generated by the wireless power transfer system. A controller measures the electrical characteristic and determines a presence of the object based on the change in the measured electrical characteristics.

20 Claims, 9 Drawing Sheets

(51) Int. Cl.
  *G01K 7/16* (2006.01)
  *G01V 3/10* (2006.01)
  *H02J 50/10* (2016.01)

(56) References Cited

U.S. PATENT DOCUMENTS

| | | |
|---|---|---|
| 11,571,976 B2 | 2/2023 | Widmer et al. |
| 11,945,319 B2 | 4/2024 | Widmer et al. |
| 2012/0248888 A1 | 10/2012 | Kesler et al. |
| 2013/0163635 A1 | 6/2013 | Karanth et al. |
| 2013/0181724 A1* | 7/2013 | Teggatz ............... H02J 50/90 374/45 |
| 2014/0084859 A1 | 3/2014 | Hall et al. |
| 2015/0331135 A1 | 11/2015 | Widmer |
| 2016/0187519 A1 | 6/2016 | Widmer et al. |
| 2016/0187520 A1 | 6/2016 | Widmer et al. |
| 2017/0033609 A1 | 2/2017 | Nakamura et al. |
| 2017/0315155 A1* | 11/2017 | Smith ............... A61B 18/1206 |
| 2018/0191200 A1 | 7/2018 | Dibben et al. |
| 2018/0198323 A1* | 7/2018 | Widmer ............... H02J 7/04 |
| 2018/0329101 A1 | 11/2018 | Roy et al. |
| 2019/0140481 A1 | 5/2019 | Keeling et al. |
| 2019/0333693 A1 | 10/2019 | Nishimura |
| 2019/0353816 A1 | 11/2019 | Widmer et al. |
| 2020/0204005 A1 | 6/2020 | Lee et al. |
| 2021/0138918 A1 | 5/2021 | Widmer et al. |
| 2023/0182589 A1 | 6/2023 | Widmer et al. |
| 2023/0246489 A1 | 8/2023 | Widmer et al. |

FOREIGN PATENT DOCUMENTS

| | | |
|---|---|---|
| EP | 2679970 | 1/2014 |
| EP | 2779359 | 9/2014 |
| EP | 3840176 | 6/2021 |
| EP | 3855600 | 7/2021 |
| GB | 2509015 | 6/2014 |
| WO | 2012004092 | 11/2015 |
| WO | 2015175406 | 11/2015 |
| WO | 2023150546 | 8/2023 |

OTHER PUBLICATIONS

"Foreign Office Action", CN Application No. 2017800826390, Jun. 3, 2020, 16 pages.
"Foreign Office Action", EP Application No. 17822979.5, Jul. 22, 2021, 6 pages.
"International Preliminary Report on Patentability", Application No. PCT/US2017/066095, Jul. 25, 2019, 9 pages.
"International Search Report and Written Opinion", Application No. PCT/US2017/066095, Mar. 27, 2018, 15 pages.
"Non-Final Office Action", U.S. Appl. No. 16/526,831, filed Jun. 22, 2022, 7 pages.
"Non-Final Office Action", U.S. Appl. No. 17/153,235, filed Jul. 5, 2022, 7 pages.
"Non-Final Office Action", U.S. Appl. No. 15/620,548, filed Mar. 22, 2019, 10 pages.
"Notice of Allowance", U.S. Appl. No. 16/526,831, filed Sep. 23, 2022, 7 pages.
"Notice of Allowance", U.S. Appl. No. 17/153,235, filed Sep. 23, 2022, 7 pages.
"Notice of Allowance", U.S. Appl. No. 15/620,548, filed May 2, 2019, 9 pages.
"International Search Report and Written Opinion", Application No. PCT/US2023/061742, Jun. 15, 2023, 13 pages.
"International Search Report and Written Opinion", Application No. PCT/US2023/061552, Apr. 21, 2023, 13 pages.
"International Preliminary Report on Patentability", Application No. PCT/US2023/061552, Aug. 6, 2024, 7 pages.
"International Preliminary Report on Patentability", Application No. PCT/US2023/061742, Aug. 6, 2024, 7 pages.

* cited by examiner

FOREIGN OBJECT DETECTION USING COMBINED INDUCTIVE AND THERMAL SENSING

CROSS-REFERENCE TO RELATED APPLICATIONS

This application claims priority to U.S. Provisional application 63/267,532, filed Feb. 3, 2022, the content of which is hereby incorporated by reference in its entirely. This application is related to U.S. patent application Ser. No. 15/620,548 filed Jun. 12, 2017, the content of which is hereby incorporated by reference in its entirety.

FIELD

This application is related generally to wireless charging power transfer applications, and specifically to a method and apparatus for detecting foreign objects using combined inductive and thermal sensing.

BACKGROUND

Inductive wireless power transfer (WPT) systems provide one example of wireless transfer of energy. In an inductive WPT system, a primary power device (or wireless power transmitter) transmits power wirelessly to a secondary power device (or wireless power receiver). Each of the wireless power transmitter and the wireless power receiver includes an inductive power transfer structure, typically a single or multi-coil arrangement of windings comprising electric current-conveying materials (e.g., copper Litz wire). An alternating current passing through the coil (e.g., of a primary wireless power transfer structure) produces an alternating magnetic field. When a secondary wireless power transfer structure is placed in proximity to the primary wireless power transfer structure, the alternating magnetic field induces an electromotive force (EMF) into the secondary wireless power transfer structure according to Faraday's law, thereby wirelessly transferring power to the wireless power receiver if a resistive load is connected to the wireless power receiver. To improve a power transfer efficiency, some implementations use a wireless power transfer structure that is part of a resonant structure (resonator). The resonant structure may comprise a capacitively loaded inductor forming a resonance substantially at a fundamental operating frequency of the inductive WPT system (e.g., in the range from 80 kHz to 90 kHz).

Inductive WPT to electrically chargeable vehicles at power levels of several kilowatts in both domestic and public parking zones may require special protective measures for safety of persons and equipment. Such measures may include detection of foreign objects in an inductive power region of the inductive WPT system where electromagnetic field exposure levels exceed certain limits. This necessity for protective measures may be particularly true for systems where the inductive power region is open and accessible. Such measures may include detection of electrically conducting (metallic) objects and living objects (e.g., humans, extremities of humans, or animals) that may be present within or near the inductive power region.

In certain applications for inductive wireless charging of electric vehicles, it may be useful to be able to detect foreign objects that may be present in the inductive power region and that could be susceptible to induction heating due to the high magnetic field strength in that region. In an inductive WPT system for electric vehicle charging operating at a fundamental frequency in a range from 80 kHz to 90 kHz, magnetic flux densities in the inductive power region (e.g., above a primary wireless power transfer structure) can reach relatively high levels (e.g., above 2 milliteslas (mT)) to allow for sufficient power transfer (e.g., 3.3 kilowatts (kW), 7 kW, 11 kW, and the like). Therefore, metallic objects or other objects present in the magnetic field can experience undesirable induction heating due to eddy current loss effects. In ferromagnetic metallic objects, induction heating may be even more intense due to additional current displacement (skin) and hysteresis loss effects. For this reason, foreign object detection (FOD) may be implemented to detect metallic objects or other objects that are affected by the magnetic field generated by the primary or the secondary wireless power transfer structure of the inductive WPT system. Once the presence of a foreign object is detected, the WPT system may reduce power or turn off and issue an alert prompting a user to remove the foreign object. Upon removal of the foreign object, regular power transfer may be resumed, initiated either manually by the user or automatically by the WPT system (e.g., based on an object removal detection).

In certain applications for inductive wireless charging of electric vehicles, it may also be useful to be able to detect living objects that may be present within or near an inductive power region where a level of electromagnetic field exposure exceeds certain limits (e.g., as defined by the International Commission on Non-Ionizing Radiation Protection (ICNIRP) recommendation). For this reason, living object detection (LOD) may be implemented to detect living objects (e.g., human extremities, animals) or other objects that may be exposed to the magnetic field generated by the primary or secondary wireless power transfer structure of the inductive WPT system. Once the presence of a living object is detected, the WPT system may immediately turn off and automatically resume regular power transfer once the presence of the living object is no more detected or after expiration of a period of time that begins when the presence of the living object is no more detected.

SUMMARY

Various implementations of systems, methods, and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in accompanying drawings and the descriptions below. Other features, aspects, and advantages will become apparent from the description, the drawings, and the claims.

In general, in one aspect, a foreign object is detected a in an inductive wireless power transfer system using a sensing system configured to sense the foreign object based on one or more of an inductive effect and a thermal effect. The sensing system includes a sense element having an electrical characteristic, the sense element being configured to sense the foreign object based on the inductive effect related to a first alternating magnetic field, and a mediating heat-sensitive material is coupled to the sense element. The mediating heat-sensitive material has a property that varies as a function of temperature when heated by the foreign object exposed to a second alternating magnetic field generated by the inductive wireless power transfer system, and the mediating heat-sensitive material changes the electrical characteristic of the sense element as a function of the property. A controller coupled to the sensing system measures the electrical characteristic of the sense element and determines the presence of the foreign object based on the change in the measured electrical characteristic caused by at least one of the inductive effect and the thermal effect through the mediating heat-sensitive material.

Aspects may include one or more of the following features, in any order or combination. The property of the mediating heat-sensitive material may be one or more of a resistivity, a conductivity, an impedance, a capacitance, an inductance, a magnetic permeability, and an electric permittivity. The mediating heat-sensitive material may be configured to substantially change the property as the temperature of the mediating heat-sensitive material passes a threshold that is higher than 373 Kelvin. The mediating heat-sensitive material may include one or more of a negative temperature coefficient (NTC) resistance material, a positive temperature coefficient (PTC) resistance material, a dielectric material with a low Curie point, and a ferrite material with a low Curie point. The sense element may include one or more turns of an electrical conductor. The sense element may be implemented on a printed circuit board. The sense element may include the mediating heat-sensitive material. The sense element may be embedded in a layer also comprising the mediating heat-sensitive material. The heat-sensitive material may be in a layer different than a layer comprising the sense element. The sense system may include an array of sense elements, and the mediating heat-sensitive material may be associated with at least one sense element of the array. The electrical characteristic measured by the controller may include one or more of an impedance, a transimpedance, a direct current (DC) resistance, a voltage, a current, an induced voltage, an impulse response, and a response of another waveform.

The controller may be configured to determine the presence of the foreign object by correlating the measured electrical characteristic with a level of the second alternating magnetic field generated by the inductive wireless power transfer system. Correlating the measured electrical characteristic with a level of the second alternating magnetic field may include at least one of inductive thermal sensing (ITS), inductive ferromagnetic sensing (IFS), and inductive motion sensing (IMS). A heat-resistant material may protect the sensing system against damage from heat from the foreign object. The heat-resistant material may constitute at least a portion of an enclosure of the wireless power transfer system. The heat-resistant material may be in a first layer exposed to the exterior of the apparatus, with the heat-sensitive material in a second layer covered by the first layer. The heat-resistant material may be configured to have a melting point higher than 473 Kelvin and to withstand a temperature reached by the foreign object higher than 473 Kelvin without losing structural integrity.

DETAILED DESCRIPTION

Figure 1:
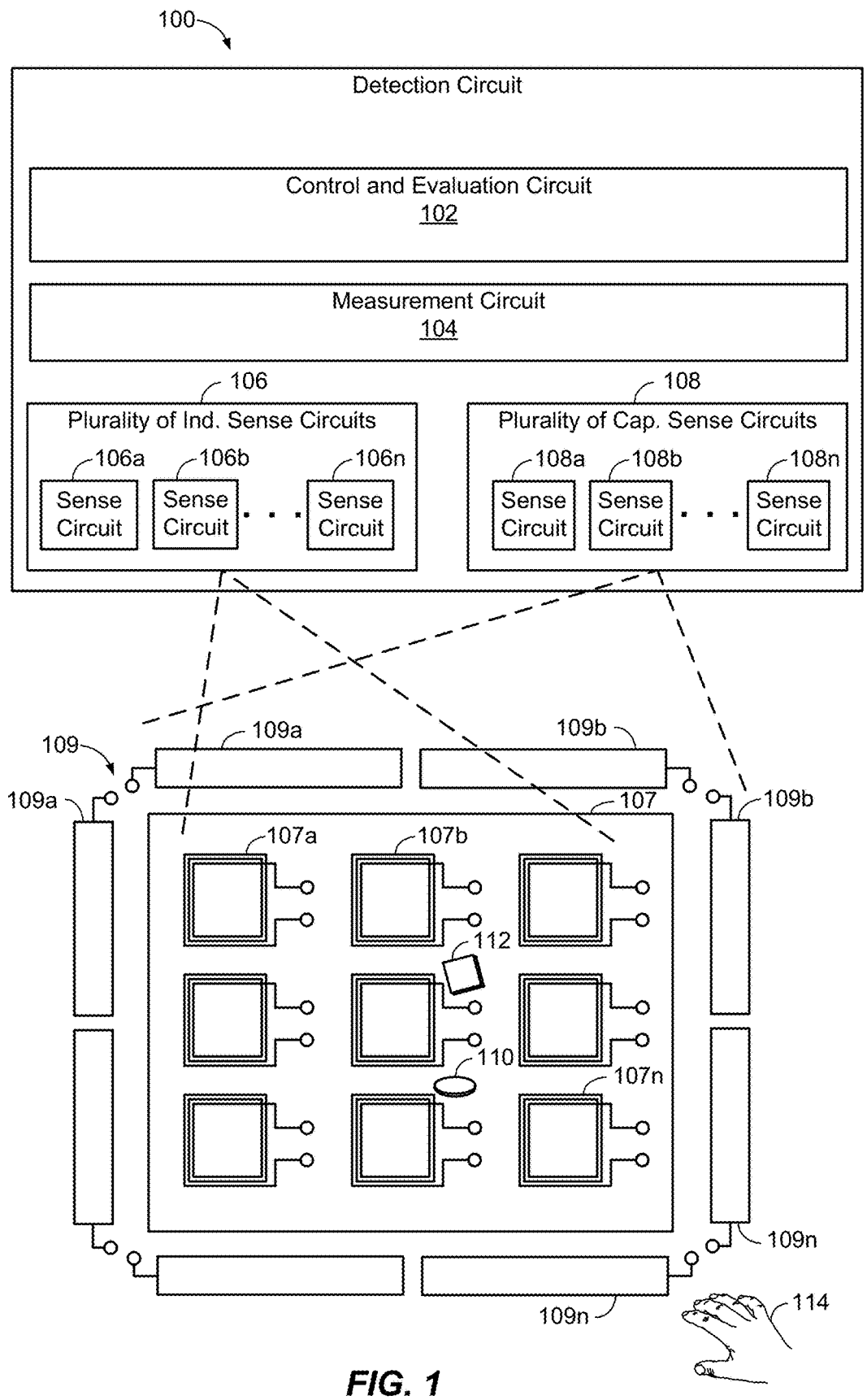
FIG. 1 is a schematic view illustrating an example implementation of a detection circuit including inductive and capacitive sense circuits, a non-living (e.g., metallic) object, and a living object.

As mentioned above, foreign object detection (FOD), and particularly metal object detection, may be valuable for a variety of applications. For detection in a predetermined region, a FOD system may include a plurality of inductive sense circuits, each including an inductive sense element (e.g., a sense coil), distributed across a predetermined area (e.g., a planar array of sense coils integrated into the ground-based wireless power transfer structure). The predetermined region may be defined by a space where metal objects may be found and where magnetic flux density exceeds certain limits (e.g., a threshold determined based on what temperature a metal object might be heated to). This space referred to as the detection space is generally a three-dimensional space above the inductive sense elements defining a detection area. The number of inductive sense elements may be related to a form factor of the detection space or detection area and a minimum size of objects that it is desirable to detect. For a system that is configured to detect small objects (e.g., a paper clip), the number of sense elements may be relatively high (e.g., on the order of 100). The FOD system may further include control and measurement circuitry for applying drive signals to each of the inductive sense circuits, each including an inductive sense element and additional elements for conditioning, as well as for measuring an electrical characteristic in each of the capacitive sense circuits and for detecting changes in the electrical characteristics that may indicate the presence of a foreign (e.g., metallic) object. An example FOD system is described in U.S. Pat. No. 10,627,257, titled Systems, Methods, and Apparatus for Detection of Metal Objects in a Predetermined Space, the entire contents of which are hereby incorporated by reference.

As also mentioned above, living object detection (LOD) (e.g., human extremities, animals) may be valuable for a variety of applications. For detection in a predetermined region, a LOD system may include a plurality of capacitive sense circuits, each including a capacitive sense element (e.g., a sense electrode) disposed, for example, along the periphery of a ground-based wireless power transfer structure of a WPT system. The predetermined region may be defined by a space that is accessible for living objects as well as where living objects may be located and an exposure magnetic field strength exceeds certain limits (e.g., as recommended by ICNIRP). This space referred to as the detection space is generally three-dimensional. The number of capacitive sense elements may be related to the detection space and a minimum size of living objects that it is desirable to detect. For a system that is configured to detect human extremities (e.g., a hand) and animals (e.g., a cat), the number of sense elements may be relatively low (e.g., on the order of 4). The LOD system may further include control and measurement circuitry for applying drive signals to each of the capacitive sense circuits, each including a capacitive sense element and additional elements for conditioning, as well as for measuring an electrical characteristic in each of the capacitive sense circuits and for detecting changes in the electrical characteristics that may indicate the presence of a living object. An example LOD system is described in U.S. Pat. No. 9,952,266, titled Object Detection for Wireless Energy Transfer Systems, the entire contents of which are hereby incorporated by reference.

In an aspect of hardware complexity reduction and cost saving, it may be useful and desirable to share use of hardware components of a detection circuit for FOD, LOD, vehicle detection (VD), and position detection (PD) functions as far as possible and sensible. A multi-purpose detection circuit configurable for FOD, LOD, VD, and PD functions is described in U.S. patent application Ser. No. 17/931,429, titled Circuit for Object Detection and Vehicle Position Determination, the entire contents of which are hereby incorporated by reference.

"Electric vehicle" describes a remote system, an example of which is a vehicle that includes, as part of its locomotion capabilities, electrical power derived from a chargeable energy storage device (e.g., one or more rechargeable electrochemical cells or another type of battery). As non-limiting examples, some electric vehicles may be hybrid electric vehicles that include, besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, and the like.

"Foreign object" describes an object that does not naturally belong to a wireless power transfer (WPT) system. A foreign object may include a metallic object, a non-living dielectric (substantially nonconductive) object, a living object (e.g., an animal, a human extremity), a vehicle, or a combination thereof. It may describe an object that needs to be detected for purposes of safety of equipment or persons, but it may also refer to an object of no harm (e.g., that has the potential to produce a false positive detection in a detection system and therefore needs to be discriminated).

FIG. 1 illustrates an example implementation of a detection circuit 100 that includes a plurality of inductive sense circuits 106a, 106b, . . . 106n and a plurality of capacitive sense circuits 108a, 108b, . . . 108n. The number of inductive sense circuits 106a to 106n and the number of capacitive sense circuits 108a to 108n may each be fewer or greater than the three that are shown. In examples mentioning an arbitrary one of such numbered sense circuits, it is referred to it as 106i and 108i, respectively. As illustrated in FIG. 1, each of the sense circuits 106a to 106n includes a corresponding inductive sense element (e.g., a sense coil) of a plurality of inductive sense elements 107a to 107n, respectively. Likewise, each of the capacitive sense circuits 108a to 108n includes a corresponding capacitive sense element (e.g., a pair of sense electrodes) of a plurality of capacitive sense elements 109a to 109n, respectively. In examples mentioning an arbitrary one of such numbered sense elements, it is referred to it as 107i and 109i, respectively.

FIG. 1 also illustrates foreign objects 110 and 112, representing non-living objects, and a living object 114. The object 110 represents a metallic (substantially electrically conductive) object that is potentially heated when exposed to the WPT magnetic field, while the object 112 represents a dielectric or ferromagnetic object that is substantially electrically non-conductive and that does not heat when exposed to the WPT magnetic field. The living object 114 may stand for a human extremity (e.g., a hand, as depicted in FIG. 1) or an animal that is dielectric and substantially electrically non-conductive.

The inductive sense elements 107a to 107n and capacitive sense elements 109a to 109n are configured to sense a presence of a foreign object (e.g., object 110) in proximity to at least one of the inductive sense elements 107a to 107n and a living object (e.g., object 114) in proximity to at least one of the capacitive sense elements 109a to 109n by measuring one or more electrical characteristics (e.g., an impedance) in each of the inductive sense circuits 106a to 106n and capacitive sense circuits 108a to 108n and by detecting changes in the measured electrical characteristics. The sense elements may also detect a presence, identification, or position of a vehicle in the same way. Each of the inductive sense circuits 106a to 106n and capacitive sense circuits 108a to 108n may also include additional conditioning circuitry (not shown in FIG. 1) configured, for example, to improve measurement of the one or more electrical characteristics and thus a detection sensitivity and reliability of the detection circuit 100. Each of the sense circuits also defines at least one measurement port (not shown in FIG. 1) where the one or more electrical characteristics are measured and refer to.

Each of the inductive sense elements 107a to 107n is shown in FIG. 1 as a "circular" coil for purposes of illustration. However, in other implementations, the inductive sense elements 107a to 107n may include a sense coil having another coil topology (e.g., a "figure-eight-like" topology). In yet other implementations, the inductive sense elements 107a to 107n may include sense coils of a mixed coil topology, (e.g., "circular" and "figure-eight-like"). In further implementations, the inductive sense elements 107a to 107n may include sense coils with a ferrite core (e.g., solenoid coils, not shown herein) that are physically smaller compared to "air" coils. In yet further implementations, the sense elements 107a to 107n may include other inductive devices that can be used for generating a magnetic field for detecting a foreign object (e.g., object 110) or vehicle or for determining a vehicle position. In some implementations (not shown herein), each of the inductive sense elements 107a to 107n, may include a double or even a triple sense coil arrangement that may be used in conjunction with a transimpedance measurement technique (e.g., based on a mutual inductance or mutual impedance). In some implementations, the inductive sense elements 107a to 107n are arranged in an array 107, such as a two-dimensional array 107 as shown in FIG. 1. However, in other implementations, the inductive sense elements 107a to 107n are arranged in other configurations that do not conform to rows or columns (radial or interleaved), are at least partially overlapping or have irregular spacing, have different sizes, have different shapes (circular, hexagonal, etc.), cover irregular detection areas, or include any combination thereof. As such the term "array" as used herein denotes a plurality of sense elements that are arranged over a predetermined area. Furthermore, the number of inductive sense elements of the array 107 and thus the number of sense circuits can vary widely based on the application, which includes the total region in which a foreign object is to be detected and the smallest size of an object the detection circuit 100 is configured to detect. Example implementations of the inductive sense element and arrangements of inductive sense elements are described in U.S. Pat. No. 9,726,518, titled Systems, Methods, and Apparatus for Detection of Metal Objects in a Predetermined Space, in U.S. Pat. No. 11,002,874, titled Foreign Object Detection Circuit Using Mutual Impedance Sensing, in U.S. Pat. No. 10,122,192, titled Sense Coil Geometries with Improved Sensitivity for Metallic Object Detection in a Predetermined Space, and in U.S. Pat. No. 10,124,687, titled Hybrid Foreign Object Detection (FOD) Loop Array Board, the entire contents of which are hereby incorporated by reference.

Each of the capacitive sense elements 109a to 109n is shown in FIG. 1 as a pair of sense electrodes for purposes of illustration. However, in other implementations, the capacitive sense elements 109a to 109n may include a single electrode providing a single terminal. In further implementations, the capacitive sense elements 109a to 109n may be configured and driven for measuring a transimpedance (e.g., based on a mutual capacitance or mutual impedance). In yet further implementations, the capacitive sense elements 109a to 109n may include other capacitive devices that can be used for generating and detecting an electric field for detecting a foreign object (e.g., object 112), living object (e.g., object 114), or vehicle (e.g., vehicle 340, FIG. 3) or for determining a type of vehicle or a vehicle position. In FIG. 1, the capacitive sense elements 109a to 109n are shown arranged in an area around the array of inductive sense elements 107a to 107n. However, in other implementations, the capacitive sense elements 109a to 109n are arranged in other configurations (e.g., distributed over the area of the array 107 of the inductive sense elements). Example implementations of a capacitive sense element (e.g., capacitive sense element 109a) and arrangements of capacitive sense elements are described in U.S. Pat. No. 9,952,266, titled Object Detection for Wireless Energy Transfer Systems, the entire contents of which are hereby incorporated by reference.

Continuing the example of FIG. 1, each of the inductive sense circuits 106a to 106n and the capacitive sense circuits 108a to 108n, including the corresponding sense elements 107a to 107n and 109a to 109n, are operably connected to a measurement circuit 104. The measurement circuit 104, including multiplexing (not shown in FIG. 1), is configured to selectively and sequentially measure one or more electrical characteristics in each of the inductive sense circuits 106a to 106n and capacitive sense circuits 108a to 108n and to provide outputs to the control and evaluation circuit 102.

The measurement circuit 104 is configured to cause each of the inductive sense elements 107a to 107n to selectively and sequentially generate an alternating magnetic field at a sense frequency (e.g., by selectively and sequentially applying a sense signal (e.g., a current) to each of the inductive sense circuits 106a to 106n). If a metallic object (e.g., object 110) is present in the alternating magnetic field, eddy currents will be generated in the object. According to Lentz's law, the eddy currents in the object will generate another (secondary) magnetic field that interacts with the primary magnetic field as generated by the respective sense element, and a mutual coupling is developed. This may cause a change in an electrical characteristic (e.g., an impedance) as measured by the measurement circuit 104 in the respective inductive sense circuit 106i. A change in a measured electrical characteristic may also be caused by a substantially non-conductive but ferromagnetic object (e.g., object 112) with a relative permeability $\mu_r>1$ that interacts with the alternating magnetic field as generated by the respective inductive sense element. Applying a sense signal to the inductive sense circuit 106i may also cause the respective inductive sense element 107i to generate an alternating electric field that may interact with a substantially non-conductive, dielectric object (e.g., non-living object 112 or living object 114) causing a change in the electrical characteristic as measured in the respective inductive sense circuit (capacitive sensing effect). This alternating electric field may also interact with a metallic (substantially electrically conductive) object (e.g., object 110). However, this effect is expected to be orders of magnitude weaker than the magnetic field effect.

The measurement circuit 104 is further configured to cause each of the capacitive sense elements (e.g., sense electrodes) 109a to 109n to selectively and sequentially generate an alternating electric field at the sense frequency (e.g., by selectively and sequentially applying a sense signal (e.g., a current) to each of the capacitive sense circuits 108a to 108n). If a substantially non-conductive, dielectric object (e.g., living object 114 or non-living object 112) with a relative permittivity $\varepsilon_r>1$ is present in the alternating electric field, it will interact with the electric field. This may cause a change in an electrical characteristic (e.g., an impedance) as measured by the measurement circuit 104 in the respective capacitive sense circuit (e.g., capacitive sense circuit 108a). A change in a measured electrical characteristic may also be caused by a metallic object (e.g., object 110) as it will also interact with the alternating electric field as generated by the respective capacitive sense element. Applying a sense signal (e.g., current) to the capacitive sense circuit 108i may also cause the respective capacitive sense element 109i to generate an alternating magnetic field that may interact with a metallic object (e.g., object 110) causing a change in the electrical characteristic as measured in the respective capacitive sense circuit (inductive sensing effect). However, this effect may be orders of magnitude weaker than the electric field effect.

Figure 2:
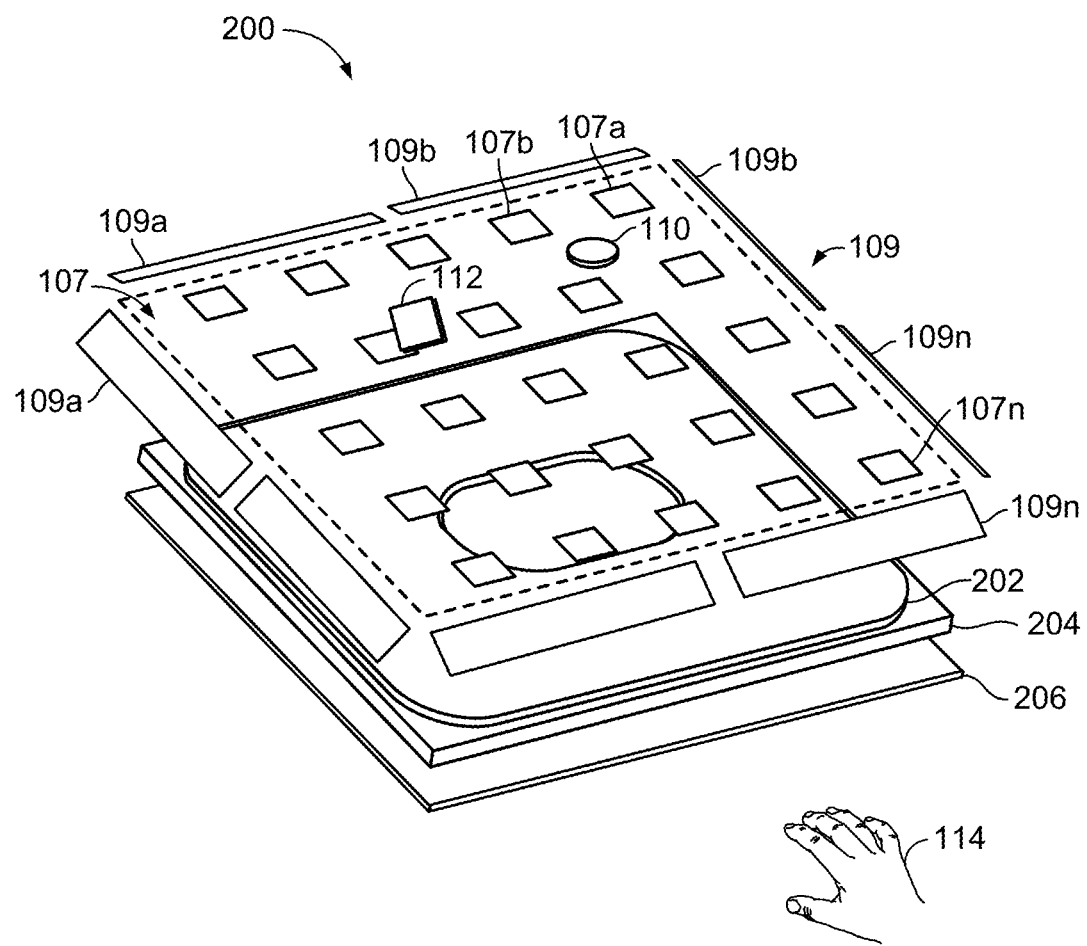
FIG. 2 is a schematic view illustrating an example implementation of a ground-based wireless power transfer structure integrating a portion of the detection circuit shown in FIG. 1 and the non-living and living objects of FIG. 1.

FIG. 2 illustrates an example implementation of a wireless power transfer structure 200 that is a portion of a WPT system. The wireless power transfer structure 200 includes a coil 202 (e.g., a Litz wire coil) also referred to as the WPT coil that is configured to generate an alternating magnetic field when driven with a current by a power conversion circuit (not shown). The wireless power transfer structure 200 also includes a ferrite structure 204 that may consist of one or more ferrite tiles and is configured to channel or provide a low reluctance path for magnetic flux. It further includes a back plate 206. In some implementations, the back plate 206 is metallic, acting as a shield configured to guide magnetic flux and to prevent the magnetic and electric fields from extending far beyond a boundary determined by the back plate 206 or at least to attenuate the field extending beyond that boundary. As an example, the back plate 206 may be formed from aluminum. Further, FIG. 2 illustrates one example of how the inductive sense element array 107 and the capacitive sense element array 109 of FIG. 1 may be integrated into the wireless power transfer structure 200. In some implementations, the wireless power transfer structure 200 also includes a tuning and matching network (not shown) to tune the wireless power transfer structure 200 for resonance substantially at the WPT operating frequency and to match an impedance to a power conversion circuit (not shown). FIG. 2 also shows foreign objects such as metallic object 110, non-metallic object 112, and living object 114 as in FIG. 1.

FIG. 2 depicts a ground-based wireless power transfer structure also sometimes referred to as a "ground assembly (GA)", a GA pad, a "base bad", or a GA resonator if integrating the tuning and matching network. The ground-based wireless power transfer structure 200 is commonly configured to transmit power to a corresponding receiver on a vehicle (not shown in FIG. 2) and may be an integral part of a grid-side assembly of the WPT system including power converters and tuning and matching networks. In some implementations, the ground-based wireless power transfer structure 200 is configured to transmit or receive power to or from the vehicle depending on an operational mode of the WPT system. In transmit mode, power is transferred from the GA to the vehicle, while in receive mode, power is transferred from the vehicle to the GA as needed (e.g., to transfer power from the vehicle to the grid) in a mode referred to as "V2G". When excited by a current, the WPT coil 202 generates a magnetic field (e.g., at the WPT operating frequency in a range from 80 to 90 kHz) for transferring power from the GA to the vehicle. Furthermore, as the ground-based wireless power transfer structure 200 may be positioned on the ground or another top-facing surface, a foreign object may come to rest at a top surface of an enclosure of the ground-based wireless power transfer structure 200. The object may be exposed to high levels of magnetic flux density if power is being transferred. As previously discussed, metallic objects or other objects present in this magnetic field can experience undesirable induction heating due to eddy current or hysteresis loss effects. In particular, the metallic object 110 may experience induction heating. Moreover, a human extremity (e.g., a hand), such as illustrated by the object 114 when approaching the wireless power transfer structure 200 may be exposed to the magnetic field. Therefore, exposure of both types of objects may require protection mechanisms as discussed herein.

Figure 3:
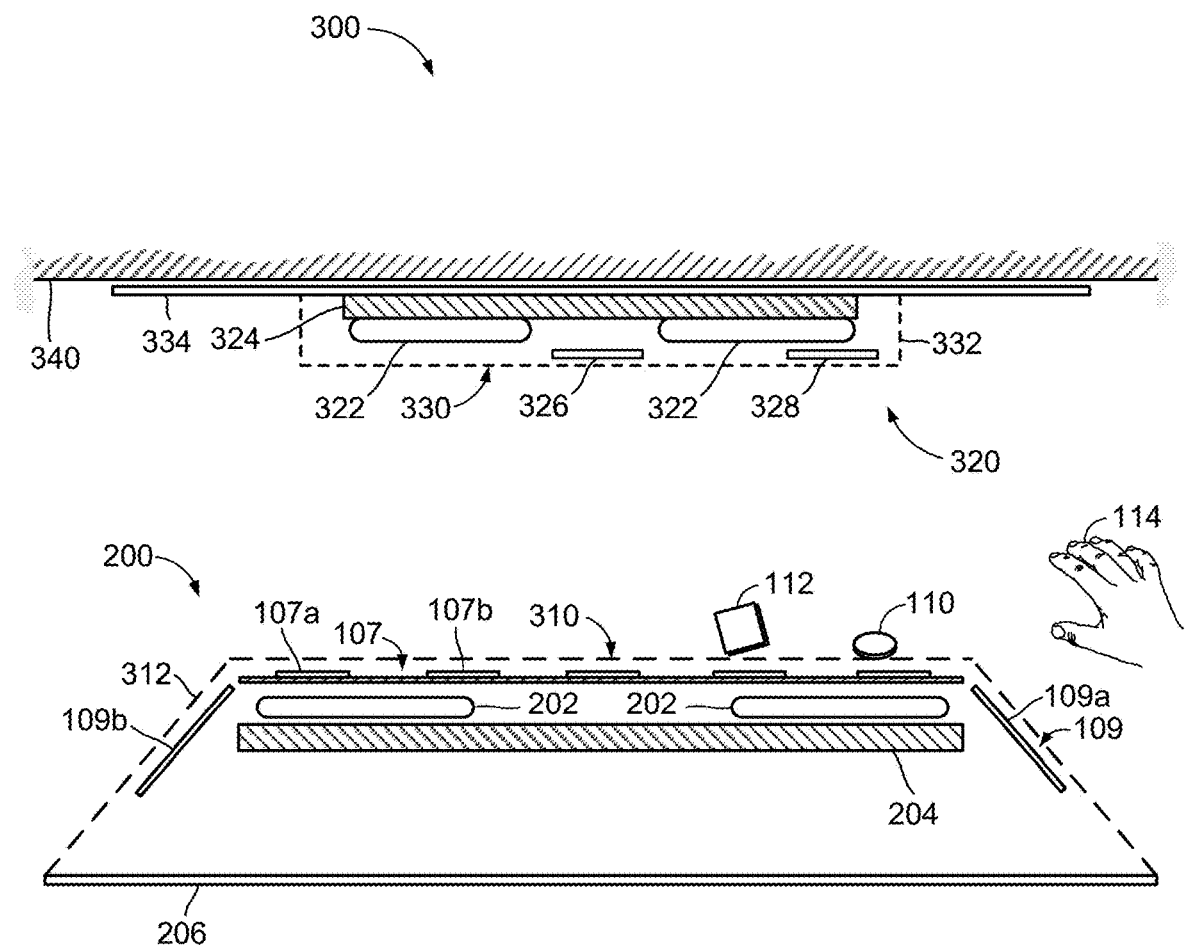
FIG. 3 is a vertical cut view illustrating a portion of a WPT system including a vehicle-based wireless power transfer structure and the ground-based wireless power transfer structure of FIG. 2 integrating a portion of the detection circuit of FIG. 1, and the non-living and living objects of FIG. 1.

FIG. 3 illustrates a vertical cut view of a portion 300 of a WPT system applicable to wireless electric vehicle charging. This portion 300 includes the ground-based wireless power transfer structure 200 with reference to FIG. 2 and a vehicle-based wireless power transfer structure 320, also called a "vehicle assembly (VA)" affixed to an underbody of a vehicle 340. The vehicle-based wireless power transfer structure 320 may be an integral part of a vehicle-side WPT system including power converters and tuning and matching networks.

The ground-based wireless power transfer structure 200 includes the WPT coil 202, ferrite structure 204, and back plate 206, as well as the inductive sense elements 107a to 107n (array 107) and capacitive sense elements 109a to 109n (array 109) as part of the detection circuit 100 shown in FIGS. 1 and 2.

FIG. 3 further illustrates an enclosure 310 that houses the other components of the ground-based wireless power transfer structure 200 such as the WPT coil 202, the ferrite structure 204, and the sense element arrays 107 and 109. The enclosure 310 includes a cover shell 312 and the back plate 206 from FIG. 2. In some implementations, the enclosure 310 may also house the tuning and impedance matching network as mentioned above and the measurement circuit 104 and the control and evaluation circuit 102 as part of the detection circuit 100 of FIG. 1. In another implementation, the enclosure 310 additionally houses a portion or all of a power conversion circuit (not shown). The enclosure 310 may be inclined along its perimeter from its edge toward its interior to form a ramp over which a vehicle may drive. The capacitive sense elements 109a to 109n may be tilted (nonparallel) with respect to a plane defined by the inductive sense element array 107. For example, the capacitive sense elements may be oriented to be substantially parallel to the inclined surface of the enclosure 310 along the enclosure's perimeter. FIG. 3 also shows the non-living objects 110 and 112 and the living object 114 from FIG. 1.

The vehicle-based wireless power transfer structure 320 includes a WPT coil 322, a ferrite structure 324, and a shield 334 made of an electrically conductive material. In some implementations, the shield 334 may be formed from a portion of the structure that the ferrite structure 324 and the WPT coil 322 are affixed to on the underbody of the vehicle 340. In this case, an enclosure 330 that houses the WPT coil 322 and the ferrite structure 324 may not house the shield 334. Other implementations are possible where the enclosure 330 includes a cover shell 332 and an electrically conductive back plate (not shown) similar to the enclosure 310 of the wireless power transfer structure 200. A power conversion circuit (not shown) may be electrically connected to the WPT coil 322 and a portion or all of the power conversion circuit may also be housed in the enclosure 330.

As discussed above, the ground-based wireless power transfer structure 200 generates a magnetic field while the vehicle-based wireless power transfer structure 320 inductively receives power via the magnetic field. In implementations supporting V2G, the vehicle-based wireless power transfer structure 320 may also generate a magnetic field and the ground-based wireless power transfer structure 200 may receive power via the magnetic field generated by the vehicle-based wireless power transfer structure.

The vehicle-based wireless power transfer structure 320 may also integrate at least one of an inductive passive beacon transponder 326 and a capacitive passive beacon transponder 328 (e.g., for purposes of PD and VD). The inductive passive beacon transponder 326 may be configured to primarily interact with inductive sense elements (e.g., the inductive sense elements 107a to 107n). In some implementations, the inductive passive beacon transponder 326 includes a transponder coil, a capacitive element to compensate for the gross reactance of the coil at the operating (sense) frequency of the detection circuit 100, and a passive impedance modulation circuit (these elements not shown herein). The capacitive passive beacon transponder 328 may be configured to primarily interact with capacitive sense elements (e.g., the capacitive sense elements 109a to 109n). In some implementations, the capacitive passive beacon transponder 328 includes a transponder electrode, an inductive element to compensate for the gross reactance of the electrode at the operating (sense) frequency of the detection circuit 100, and a passive impedance modulation circuit (these elements not shown herein). In further implementations (not shown herein), the passive beacon transponder (e.g., passive beacon transponder 326) is configured to interact with both the inductive and the capacitive sense elements of the detection circuit 100.

In some implementations (not shown) the vehicle-based wireless power transfer structure 320 also includes one or more inductive and capacitive sense elements configured to detect non-living and living objects (e.g., metallic object 110 and living object 114) in the same manner as is described for the detection circuit 100.

Figure 4:
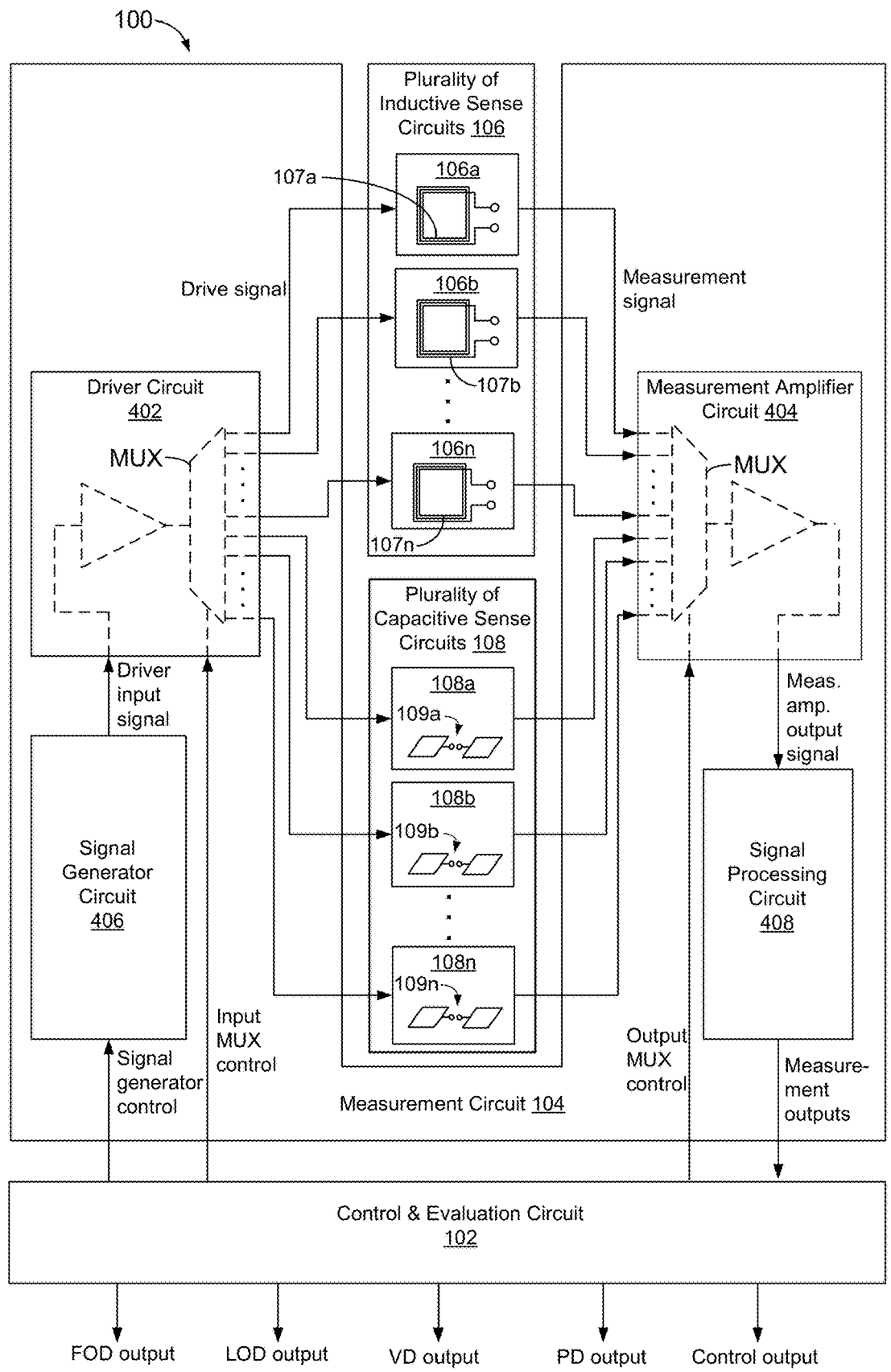
FIG. 4 is a generic block diagram of an example implementation of the detection circuit of FIG. 1

FIG. 4 is a generic block diagram illustrating an example implementation or operation of a detection circuit 100. The detection circuit 100 includes the inductive sense circuits 106a to 106n including the inductive sense elements 107a to 107n, the capacitive sense circuits 108a to 108n including the capacitive sense elements 109a to 109n, the measurement circuit 104, and the control and evaluation circuit 102 with reference to FIG. 1.

Each of the inductive sense circuits 106a to 106n may also include an associated capacitive element (not shown) to compensate for the gross reactance as presented at terminals of the inductive sense element at the sense frequency. Each of the capacitive sense circuits 108a to 108n may also include an associated inductive element (not shown) to compensate for the gross reactance as presented at terminals of the capacitive sense element at the sense frequency. At least one of the inductive and capacitive sense circuits also includes an impedance matching element (e.g., a transformer) for transforming the impedance of the sense circuit to match with an operating impedance range of the multipurpose object detection circuit 100. In an example implementation, each of the inductive sense circuits 106a to 106n is naturally matched with an operating impedance range without using an additional impedance matching element. However, the capacitive sense circuits 108a to 108n are not naturally matched, and therefore an additional impedance matching element (e.g., a transformer) is used. In another example implementation, it is vice-versa. In a further example implementation, both the inductive sense circuits 106a to 106n and the capacitive sense circuits 108a to 108n include an additional impedance matching element.

The measurement circuit 104 is electrically connected to the inductive and capacitive sense circuits and configured for selectively and sequentially measuring one or more electrical characteristics (e.g., an impedance) in each of the inductive and capacitive sense circuits according to a predetermined time multiplexing scheme. Outputs of the measurement circuit 104, also referred to as measurement outputs as indicated in FIG. 4, are indicative of the measured one or more electrical characteristics. The measurement circuit 104 further includes a driver circuit 402, a measurement amplifier circuit 404, a signal generator circuit 406, and a signal processing circuit 408.

The driver circuit 402, including an input multiplexer (input MUX) circuit is electrically connected to the inductive sense circuits 106a to 106n and the capacitive sense circuits 108a to 108n and configured to selectively and sequentially apply a drive signal (e.g., a current signal) at the sense frequency to each of the inductive sense circuits 106a to 106n and the capacitive sense circuits 108a to 108n based on a driver input signal generated by the signal generator circuit 406.

The measurement amplifier circuit 404, including an output multiplexer (output MUX) circuit, is electrically connected to the inductive sense circuits 106a to 106n and the capacitive sense circuits 108a to 108n and configured to selectively and sequentially amplify a measurement signal (e.g., a voltage signal) in each of the inductive sense circuits 106a to 106n and the capacitive sense circuits 108a to 108n and to provide a measurement amplifier output signal indicative of the measurement signal in each of the sense circuits.

The signal generator circuit 406 electrically connected to the input of the driver circuit 402, is configured to generate the driver input signal.

The signal processing circuit 408, electrically connected to the output of the measurement amplifier circuit 404, is configured to receive and process the measurement amplifier output signal and to determine the one or more electrical characteristics in each of the inductive and capacitive sense circuits based on the driver input signal and the measurement amplifier output signal. Processing the measurement amplifier output signal may include filtering, combining, averaging, etc. Filtering may include reducing a disturbance (e.g., noise) component superimposed on a sense signal as received by the signal processing circuit 408 to improve a signal-to-noise ratio (SNR) in measurement outputs of the signal processing circuit 408.

The control and evaluation circuit 102 is electrically connected to the measurement circuit 104 and configured to control the input MUX circuit and the output MUX circuit of the driver circuit 402 and the measurement amplifier circuit 404 via input MUX control and output MUX control, respectively, as indicated in FIG. 4. Input and output MUX circuit control is according to the predetermined time multiplexing scheme, to evaluate the one or more electrical characteristics (measurement outputs) as measured in each of the inductive and capacitive sense circuits and to determine at least one of a presence of a foreign object, a living object, or a vehicle, a type of vehicle, and a vehicle position based on changes in the measured one or more electrical characteristics. The control and evaluation circuit 102 may provide various outputs as indicated in FIG. 4. In a detection circuit 100 configured for FOD, LOD, VD, and PD, the control and evaluation circuit 102 provides a corresponding FOD output, LOD output, VD output, and PD output.

The dashed lines used in FIG. 4 emphasize that the components and their configuration in the measurement circuit 104 and particularly in the driver circuit 402 and the measurement amplifier circuit 404 are illustrative, and other implementations may have these or other components configured to drive the sense circuits 106a to 106n and 108a to 108n with a drive signal and to amplify a measurement signal in each of the sense circuits 106a to 106n and 108a to 108n. Furthermore, while certain circuit elements are described as connected between other elements, it should be appreciated that there may be other circuit elements in various implementations that may also be in between the two elements described as electrically connected (e.g., other elements interposed). In an example alternative implementation (not shown herein) of the measurement circuit 104, there is only one MUX circuit in common for both the driver circuit 402 and the measurement amplifier circuit 404.

Example implementations of the detection circuit 100 are described in U.S. Pat. No. 9,726,518, titled Systems, Methods, and Apparatus for Detection of Metal Objects in a Predetermined Space, in U.S. Pat. No. 9,921,045, titled Systems, Methods, and Apparatus for Increased Foreign Object Detection Loop Array Sensitivity, in U.S. Pat. No. 10,295,693, titled Systems, Methods, and Apparatus for Foreign Object Detection Loop Based on Inductive Thermal Sensing, in U.S. Pat. No. 10,302,795, titled Systems, Methods, and Apparatus for Detecting Ferromagnetic Objects in a Predetermined Space, in U.S. Pat. No. 10,298,049, titled Systems, Methods, and Apparatus for Detecting Metallic Objects in a Predetermined Space via Inductive Kinematic Sensing, in U.S. Pat. No. 11,046,193, titled Foreign Object Detection Circuit Using Current Measurement, in U.S. Pat. No. 10,855,117, titled Extended Foreign Object Detection Signal Processing, and in U.S. Pat. No. 11,002,874, titled Foreign Object Detection Circuit Using Mutual Impedance Sensing, the entire contents of which are hereby incorporated by reference.

In an example operation of the detection circuit 100, a sense signal is selectively and sequentially applied to each of the inductive sense circuits 106a to 106n and to each of the capacitive sense circuits 108a to 108n according to a time division multiplexing scheme and in a round robin fashion. The sense signal for driving an inductive sense circuit is applied in a time interval (time slot) allocated to that sense circuit and has a maximum duration equal to or shorter than the duration of the time slot. The time frame corresponding to the sum of time slots allocated to the inductive sense circuits 106a to 106n and capacitive sense circuits 108a to 108n is also referred to herein as the scan cycle or the repetition period.

In an aspect, to reduce the duration of the scan cycle, a first sense signal is selectively and sequentially applied to each of a portion of the inductive sense circuits 106a to 106n and capacitive sense circuits 108a to 108n and a second sense signal is concurrently, selectively and sequentially applied to each of the remaining portions of the inductive and capacitive sense circuits. Concurrently applying two or more sense signals reduces the scan cycle and may result in a reduced detection latency with respect to FOD and LOD and in an increased position update rate with respect to PD (e.g., using the passive beaconing approach as previously described).

In an example implementation or operation of the detection circuit 100, the concurrently applied sense signals are sinusoidal signals of the same frequency. In another example, the concurrently applied sense signals are sinusoidal signals but differ in frequency.

In a further example, each of the concurrent sinusoidal sense signals as applied in time slots allocated to the same sense circuit starts with the same phase (e.g., zero-phase). In some implementations using more than two current sense signals, starting sense signals in time slots allocated to the same sense circuit with the same phase may help to mitigate interference caused by intermodulation effects as described in U.S. Pat. No. 10,855,117, mentioned above.

In some implementations, time slots of a scan cycle are reallocated based on some conditions (e.g., whether WPT is active or inactive). For example, it may be desirable to reduce detection latency with respect to LOD when WPT is active. Therefore, in an example operation, two or more time slots of a scan cycle are allocated to each of the capacitive sense circuits 108a to 108n when WPT is active. Conversely, the LOD function may not be required when WPT is inactive, so time slots of a scan cycle are only allocated to inductive sense circuits when WPT is inactive. In another example, two or more time slots of a scan cycle are allocated to each of the inductive sense circuits and one time slot is allocated to each of the capacitive sense circuits when WPT is inactive. This mode of operation may maintain a limited LOD function when WPT is inactive (e.g., for monitoring proper functioning of the detection circuit 100 with respect to LOD). Moreover, time spacing between time slots allocated to the same sense circuit in any of the scanning modes described above is maximized.

The control and evaluation circuit 102 is configured to control the measurement circuit 104 (e.g., the multiplexing) and to evaluate the outputs of the measurement circuit 104 (measurement outputs) as indicative of the one or more measured electrical characteristics to determine at least one of a presence of a foreign object, living object, or vehicle, a type of vehicle, and a vehicle position based on changes in the measurement outputs.

In some implementations, the control and evaluation circuit 102 may include decision functions needed for FOD, LOD, and VD as well as position calculation functions needed for PD. In other implementations, the vehicle position is determined in a unit (not shown) external to the detection circuit 100 based on outputs (e.g., raw data) from the control and evaluation circuit 102 and on outputs provided by other ground- or vehicle-based sensors (not shown).

In an example implementation or operation of the control and evaluation circuit 102, the evaluation is based on a time-differential detection (TDD) scheme that is sensitive (e.g., to a relatively fast change in a sequence (time-series) of consecutive measurement outputs, each associated with a same at least one sense circuit of the plurality of sense circuits 106a to 106n and 108a to 108n). A relatively fast change may be defined as a change that is substantially faster than a drift of a measured electrical characteristics due to a varying ambient temperature of a sense circuit.

In some implementations or operations based on a TDD scheme, a presence of an object is assumed if at least one difference between a first measurement output associated with a sense circuit at a first time and a second measurement output associated with the same sense circuit at a second time exceeds a threshold. Using TDD, an object can be detected when it enters or leaves the proximity of a sense element or generally when it moves in the proximity of the sense element.

In a further example implementation or operation of the detection circuit 100, the evaluation is based on a sense circuit differential detection scheme that is sensitive to differences between outputs of the measurement circuit 104 associated with different sense circuits of the plurality of sense circuits. This detection scheme may be referred to as space-differential detection (SDD). In some implementations or operations based on SDD, a presence of an object is assumed if at least one difference between a first measurement output associated with at least one first sense circuit and a second measurement output associated with at least one second sense circuit exceeds a threshold. In some implementations or operations of a true SDD scheme, the plurality of measurement outputs used to determine a difference refer to substantially the same time. It may be appreciated that in certain cases SDD may be less sensitive and reliable than TDD because individual sense circuits of the plurality of sense circuits may be at least partially differently affected by ambient temperature, mechanical impacts, and aging.

In some aspects, TDD may be sensitive to movements of metallic structures in the environment of the sense element array. Such environmental effects may include movements of the metallic underbody structure of the vehicle when the vehicle is parked over the wireless power transfer structure. These movements may cause false detections in certain implementations of a detection circuit that is solely based on a TDD approach. Therefore, in some aspects, it may be desirable to mitigate such disturbance effects.

Combining TDD with SDD is one approach to effectively discriminate such disturbance effects. In certain implementations or operations of combined TDD and SDD, a presence of an object is determined by evaluating at least one difference between a TDD output associated with at least one sense circuit and a reference value that is determined based on a plurality of TDD outputs each associated with one of the sense circuits. This reference value may be, for example, a mean value, a median value (50th percentile), or any other statistical value that is derived from the measurement outputs. It may be appreciated that this special detection scheme has the potential to discriminate environmental effects (e.g., from a moving vehicle underbody) that may produce changes in an electrical characteristic (e.g., an impedance) in a majority (cluster) of sense circuits. This special scheme may be considered as a mechanism that automatically adapts the detection threshold used in the control and evaluation circuit 102 for determining a presence of an object. More specifically, in some implementations or operations, the control and evaluation circuit 102 automatically adjusts the reference value as described above. When the vehicle underbody is moving, the reference value (detection threshold) may increase. Increasing the reference value reduces the false detection rate but also the detection sensitivity to some extent. Therefore, a somewhat lower sensitivity may be accepted for an object entering the predetermined space while the vehicle is moving. As soon as the vehicle underbody comes to rest, the reference value settles automatically, and the detection circuit 100 may return to its ordinary detection sensitivity maintaining a specified false detection rate.

Inductive thermal sensing (ITS) described in U.S. Pat. No. 10,295,693 (incorporated herein) is a specialized detection scheme for detecting metallic objects of a category characterized by at least one electrical property (e.g., conductivity, permeability) that can be inductively sensed at the FOD sense frequency, is a function of the object's temperature, and, when the object is heated, changes at a rate substantially faster than a system-intrinsic thermal drift in absence of the object. An object of this category can potentially be detected by exposing it to a sufficiently strong alternating magnetic field to cause induction heating as previously explained. In some implementations, this magnetic field is the low-frequency magnetic field as generated by the wireless power transfer system.

Non-limiting examples of objects detectable by ITS may be a cigarette packet including a metallized foil, an aluminum cover (lid) of a yoghurt cup, a chewing gum wrapper, a cigarette lighter with a metallized lighter head, and a paper clip. These objects may be characterized by rapid heating (e.g., in seconds) if exposed to an alternating magnetic field with a flux density above 1 mT at a frequency of 85 kHz, and by at least one electrical property that substantially changes as a function of temperature.

It may be appreciated that an object of this category, when heated, may also change an electrical characteristic (e.g., impedance) of an inductive sense element (i.e., one or more of sense elements 107a-107n) proximate to the object. This will result in a change in an electrical characteristic as measured in a corresponding inductive sense circuit (e.g., sense circuits 106a-106n) by the measurement circuit 104 at the FOD sense frequency and thus in a change in the measurement outputs. Exposing the object to a heating magnetic field may be considered as stimulating the object to make it detectable on an absolute basis without the need for a precise calibration and long-term stability of circuits or by means of a TDD scheme as described above.

In some implementations or operations of ITS, a potential metallic object is stimulated by intermittently applying the magnetic field exposure in a manner so that the object's temperature follows exposure ON and OFF cycles distinctly, but not exceeding a critical level. If an object of the above-described category is proximate to at least one inductive sense element, the associated measurement outputs will also follow the exposure ON and OFF cycles. In an alternative implementation or operation of ITS, a potential metallic object is stimulated by changing the magnetic field exposure between a higher level and a lower level rather than by applying ON/OFF cycling.

In some implementations of a detection circuit 100 using ITS, a presence of an object is determined by the control and evaluation circuit 102 based on a correlation between a sequence of measurement outputs indicative of an electrical characteristic of an inductive sense circuit as determined at the FOD sense frequency and a signal indicative of the level of magnetic field exposure used for heating (stimulation). The magnetic field exposure level may be sensed using at least one of the inductive sense elements 107a to 107n and with the measurement amplifier circuit 404 and the signal processing circuit 408 also configured to measure the voltage induced into the at least one inductive sense element.

In some example implementations or operations of the detection circuit 100, ITS is combined with a SDD scheme. A presence of an object is assumed if at least one difference between a level of correlation between measurement output and magnetic field exposure associated with at least one first sense circuit (e.g., inductive sense circuit 106a) and a level of correlation associated with at least one second sense circuit (e.g., inductive sense circuit 106b) exceeds a threshold.

In some implementations, the system intrinsic thermal effect may occur due to one or more properties (e.g., resistance, permittivity) of the conductive and insulting materials included in the inductive sense elements that are also a function of temperature. When exposed to the low-frequency WPT magnetic field, the one or more properties may change, causing the electrical characteristic of the inductive sense element to change (e.g., to drift). In the presence of a metal object, the system intrinsic thermal effect will superimpose with a system extrinsic thermal effect produced by the object, thus falsifying or even predominating the wanted system extrinsic effect. Therefore, in some implementations, the detection circuit 100 employs a process of calibration (or learning) by determining the change (e.g., drift) of the electrical characteristic as produced by the system intrinsic thermal effect in absence of any foreign object. While in normal operation, the control and evaluation circuit 102 may compensate for (e.g., subtract) the system intrinsic effect, resulting in an improved sensitivity for detecting metal objects based on ITS.

In a further implementation, the system intrinsic thermal effect is reduced by using special materials or components configured to reduce a thermal coefficient in the one or more properties.

Inductive ferromagnetic sensing (IFS) described in U.S. Pat. No. 10,302,795 (incorporated herein) is another specialized detection scheme for detecting metallic ferromagnetic objects of a category characterized by at least one electrical property (e.g., conductivity, permeability) that can be inductively sensed at the FOD sense frequency and that is a function of an instantaneous amplitude of a biasing magnetic field in a manner such that it can be substantially varied (modulated) by applying a low frequency biasing magnetic field (e.g., the 85 kHz WPT magnetic field). In ferromagnetic objects, this function is generally non-linear, meaning that a negative and a positive magnetic field amplitude change an electrical property equally, resulting in a rectified modulation. This rectified modulation produces a DC component, a fundamental frequency component at double the frequency of the biasing field (e.g., 170 kHz), and, depending on the degree of saturation, higher order harmonics. The modulation function may also include memory (hysteresis) effects and thermal effects (e.g., Curie temperature effect).

Non-limiting examples of objects detectable by IFS are objects made of ferromagnetic steel such as paper clips, pieces of wire, nails, pins, screws, nuts, and washers. These objects may be characterized by a pronounced magnetic biasing effect if exposed to an alternating magnetic field with a flux density above 1 mT at a frequency of around 85 kHz and by at least one electrical property that substantially changes as a function of the exposure flux density.

It may be appreciated that an object of this category, when exposed to the low-frequency magnetic field, may also modulate an electrical characteristic (e.g., impedance) of an inductive sense element (e.g., one of sense elements 107a-107n) proximate to the object. This will result in a modulation of an electrical characteristic as measured in a corresponding inductive sense circuit (e.g., one of sense circuits 106a-106n) at the FOD sense frequency by the measurement circuit 104. Exposing the object to the magnetic field will cause magnetic biasing that may be considered as stimulating the object to make it detectable on an absolute basis without the need for a precise calibration and long-term stability of circuits or by means of a TDD scheme as described above.

In the frequency domain, the modulation by the biasing low-frequency magnetic field can manifest in a change of a spectral peak at the FOD sense frequency (corresponding to the DC component of the modulation) but also in the occurrence of modulation sidebands on the left and the right of the FOD sense frequency. The modulation sidebands may include one or more spectral peaks in both the lower and the upper sideband corresponding to the fundamental and higher order harmonics having an offset of n times the fundamental modulation frequency (e.g., 2×85 kHz) from the FOD sense frequency, where n is an even integer including 2, 4, 6, etc. In certain implementations, the signal processing circuit 408 extracts the component at the FOD sense frequency (DC component of the rectified modulation) and the measurement outputs are indicative of the DC component. In other implementations, it extracts one or more of the fundamental and harmonics components of the modulation spectrum and the measurement outputs are indicative of one or more of the fundamental and harmonics components.

In some implementations or operations of IFS, a potential metallic object is stimulated by applying the low-frequency magnetic field (e.g., with a frequency of 85 kHz) in a manner that modulates the object's electrical properties during an exposure ON cycle but with a level and duration that doesn't cause the object to exceed a critical temperature. The exposure ON cycle may be considered as a substantially rectangular pulse with respect to an envelope of the low-frequency magnetic field. If an object of the above-described category is proximate to at least one inductive sense element, the associated measurement outputs will also change for the duration of the exposure ON cycle (e.g., the pulse duration). In an alternative implementation or operation of IFS, a potential metallic object is stimulated by changing the magnetic field exposure between a higher level and a lower level rather than by applying ON/OFF cycles.

In some implementations of a detection circuit 100 using IFS, a presence of an object is determined by the control and evaluation circuit 102 based on a correlation between a sequence of measurement outputs indicative of an electrical characteristic of an inductive sense circuit as determined at one or more of the FOD sense frequency and a modulation sideband and a signal indicative of the level of magnetic field exposure used for modulation (stimulation). The magnetic field exposure level may be sensed using at least one of the inductive sense elements 107a to 107n in a manner as described above with reference to ITS.

In certain implementations of the control and evaluation circuit 102, a presence of an object is determined based on a correlation as described above but using ITS and IFS jointly. This may improve detection of small ferromagnetic objects exhibiting both a thermal effect and a magnetic biasing effect (e.g., a paper clip).

In some implementations, a magnetic biasing effect may also occur in the ferrite material used in the wireless power transfer structure (e.g., in ferrite structure 204 of wireless power transfer structure 200 of FIGS. 2 and 3) causing a change in an electrical characteristic (e.g., impedance) of an inductive sense element when the low-frequency WPT magnetic field is applied. In the presence of a ferromagnetic object, this system intrinsic magnetic biasing effect will superimpose with a system extrinsic magnetic biasing effect produced by the object, thus falsifying or even predominating the wanted system extrinsic effect. Therefore, in some implementations, the detection circuit 100 employs a process of calibration (or learning) by determining the change in the electrical characteristic as produced by the system intrinsic biasing effect in absence of any foreign object. While in normal operation, the control and evaluation circuit 102 may compensate for (e.g., subtract) the system intrinsic effect, resulting in an improved sensitivity for detecting ferromagnetic objects based on IFS.

In a further implementation, the system intrinsic magnetic biasing effect is reduced by using a ferrite structure including a ferrite material configured to reduce a magnetic biasing effect when exposed to the low-frequency magnetic field.

Inductive motion sensing (IMS) as described in U.S. Pat. No. 10,298,049 (incorporated herein) is a further specialized detection scheme for detecting an object by its relative motion (e.g., when the object is mechanically moved relative to the sense elements). The relative movement of an object in proximity of a sense element may produce a change in an electrical characteristic (e.g., impedance) of a corresponding inductive sense circuit and consequently in the measurement outputs of the measurement circuit 104.

In an example implementation or operation of IMS, an object is mechanically moved back and forth relative to the sense element array 107. This may be accomplished by moving the top surface of the enclosure 310 of FIG. 3 where the object may come to rest, a portion of the wireless power transfer structure 200, or both. In some implementations or operations of IMS, an object is moved relative to the sense elements with an amplitude in the centimeter range and at a low frequency (e.g., 3 Hz). In other implementations or operations, the object is moved (vibrated) with an amplitude in the millimeter or even submillimeter range at a higher frequency (e.g., 100 Hz).

In another implementation or operation of IMS, a metal object is moved by applying a time-varying magnetic field exerting electrodynamic forces on the object (e.g., due to eddy currents induced into the object) as described in U.S. Pat. No. 9,726,518 (incorporated herein). In this implementation or operation, the object may be a low-mass object (e.g., a thin metal foil) and the applied alternating magnetic field may be the WPT low-frequency magnetic field (e.g., 85 kHz). In a further implementation or operation of IMS, a ferromagnetic metal object (e.g., object 110) is moved by applying a magnetic field exerting magnetic forces on the object.

In yet another implementation or operation of IMS, an object (e.g., object 110) is moved by gravitational or deformational forces. An example may be a composite object that includes a metallic and a plastic portion (e.g., a plastic yoghurt cup with an aluminum lid). The metallic portion, when inductively heated, may cause the plastic to partially melt or deform and therefore the metallic part to move slightly.

In some implementations or operations of IMS, a presence of an object is determined based on a correlation between a measurement output indicative of a measured electrical characteristic (e.g., impedance) and a signal indicative of a mechanical movement. In other implementations or operations of IMS, a presence of an object is determined based on a correlation between a measurement output indicative of a measured electrical characteristic and a signal indicative of a level of magnetic field exposure causing the object to move.

In some implementations or operations of the detection circuit 100, one or more power correlation-based detection schemes (e.g., ITS, IFS, IMS) are employed in a precharging phase (e.g., before starting the regular charging process) when the vehicle is parked over the ground-based wireless power transfer structure such that the wireless power transfer structure cannot be easily accessed by persons or animals. In such conditions, the use of ITS, IFS, and IMS requiring the WPT coil to be excited by a relatively high current (e.g., >30 Arms) may be considered safe and access of a living object can be more easily protected by LOD. This procedure using a correlation-based detection scheme is to verify that the ground-based wireless power transfer structure is clear for WPT (e.g., charging). This procedure may be also referred to as a "clean pad check" and may last a few minutes.

In other implementations or operations and if supported by the WPT system and a management system of the vehicle battery, the detection circuit 100 employs one or more of a power correlation-based detection scheme (e.g., ITS, IFS, IMS) during regular power transfer. Use of a correlation-based detection scheme may require the WPT system to frequently and rapidly ramp up and ramp down power.

Object Detection with Mediating Heat-Sensitive Material

A potential for induction heating of a certain category of metal objects may not be detectable by any of the above-discussed power correlation schemes (e.g., ITS, IFS, IMS) if the sense frequency is in the MHz range. Objects of this category may exhibit neither a pronounced thermal or magnetic biasing effect nor movement if exposed to the WPT magnetic field. This category includes copper- or nickel-coated objects with a core of ferromagnetic steel (e.g., certain coins). An undetectable object resting on the top surface of the enclosure 310 of the wireless power transfer structure 200 as illustrated in FIG. 3 may heat up when exposed to the WPT magnetic field and may melt into the enclosure 310, potentially causing irreparable damage if the cover shell 312 of the enclosure 310 is made of a standard low-cost plastic.

Accordingly, a method and apparatus for protecting a wireless power transfer structure from such objects is desirable. In certain aspects, a wireless power transfer structure includes one or more portions of a mediating heat-sensitive material. Foreign objects may be detected based on a change in a property of the mediating heat-sensitive material rather than a change in a property of the object itself. The portions of the heat-sensitive material can advantageously be a part of a system configured to detect foreign objects in proximity to the wireless power transfer structure based on a thermal effect. In some aspects, the heat-sensitive material may be a material that changes an electrical resistance based on a temperature of the material. More generally, a heat-sensitive material may be a material that changes an impedance as measured at an operating frequency (e.g., the FOD sense frequency) as a function of the material's temperature. More specifically, a heat-sensitive-impedance material may change one or more of a resistivity, a conductivity, a capacitance, an inductance, an electric permittivity, a magnetic permeability, and another electrical characteristic based on a temperature of the material.

In an aspect, the heat-sensitive material may be a material that changes its electrical conductivity as a function of temperature. An example heat-sensitive material may have a conductivity with a pronounced negative temperature coefficient (NTC) characteristic such that its conductivity substantially increases as temperature rises and decreases as temperature falls. The conductivity of the heat-sensitive material may rapidly and substantially increase as the temperature exceeds a threshold (e.g., 100° Celsius (C), 373 Kelvin (K)). In an implementation, the heat-sensitive material is a doped polymer (e.g., CoolPoly® thermally conductive plastic from Celanese Corporation) with an NTC characteristic that has a conductivity that substantially increases when the temperature rises above 100° C. (373 K). In another example, the heat-sensitive material acts substantially as an insulator at temperatures below the threshold and becomes electrically conductive when the temperature exceeds the threshold. In some implementations, the heat-sensitive material is a type of ceramic or a crystalline material with a pronounced NTC characteristic (e.g., due to a phase change in the crystalline structure when the temperature rises).

In another aspect, the heat-sensitive material may have a resistance with a pronounced positive temperature coefficient (PTC) characteristic such that its resistance substantially increases as temperature rises and decreases as temperature falls. In an implementation, the heat-sensitive material is a PTC screen printable ink (e.g., Loctite® PTC ink from Henkel Corporation) with a defined temperature threshold whose sheet resistance ($\Omega$/square) increases rapidly when the temperature rises above the threshold.

In a further aspect, the heat-sensitive material may change its electric permittivity (e.g., dielectric constant) as a function of temperature. An example of such material has a permittivity that rapidly changes when a temperature exceeds a threshold (e.g., 100° C., 373 K). This threshold may be the Curie temperature of the dielectric material. In an implementation, the heat-sensitive material includes Barium Titanate ($BaTiO_3$) or similar chemical compounds with a low Curie point (e.g., near 100° C., 373 K).

In yet another aspect, the heat-sensitive material may change its magnetic permeability as a function of temperature. An example of such material is a ferrite powder plastic composite that has a permeability that rapidly changes when a temperature exceeds a threshold. This threshold may be the Curie temperature of the ferrite material. In an implementation, the ferrite material is a chemical composition of manganese-zinc (MnZn) and at least one of an iron-oxide ($Fe_2O_3$) or zinc-oxide (ZnO) exhibiting a relatively low Curie point (e.g., near 100° C., 373 K) that can be controlled by its oxide content.

In an aspect of IFS, use of a material with a heat-sensitive permeability may increase the system intrinsic magnetic biasing effect as previously discussed in connection with FIG. 4. Therefore, in some implementations, the heat-sensitive material is also configured to reduce a material intrinsic magnetic biasing effect. In other implementations, the heat-sensitive material is also configured to reduce an overall intrinsic magnetic biasing effect caused by the heat-sensitive material (e.g., together with the ferrite structure 204). In some implementations, the intrinsic magnetic biasing effect is controlled by one of a grain size of the ferrite powder, a mixing ratio of different grain sizes, and the chemical composition of the ferrite powder.

In yet a further aspect, the heat-sensitive material may change another physical (non-electrical) property as a function of temperature, such as by changing shape. This deformation may cause a metallic object to move slightly, making it detectable, using IMS as described above, by a change in a measured electrical characteristic (e.g., impedance) of an inductive sense element.

Further, certain aspects combine inductive sensing with heat-sensitive materials to detect metallic objects using a sensing system that combines a plurality of sense elements with a mediating heat-sensitive material, wherein each sense element comprises an electrically conductive structure. At least a portion of the plurality of sense elements is configured as an inductive sense element with an electrical characteristic that changes in the presence of a metallic object based on an inductive effect. The mediating heat-sensitive material has a property that varies as a function of a temperature as described above when heated by a metallic object that is resting on the top surface of the enclosure (e.g., enclosure 310 of FIG. 3) and that is exposed to the alternating magnetic field generated by the wireless power transfer structure. The mediating heat-sensitive material changes an electrical characteristic of at least a portion of the plurality of sense elements as the property changes and thereby mediates sensing of the object based on a thermal effect. The electrical characteristic of each of the sense elements may be periodically measured by the measurement circuit 104 in a time multiplexing fashion as discussed in connection with FIG. 4. Measurement outputs of the measurement circuit 104 are evaluated and monitored by the control and evaluation circuit 102 configured to take a decision if the change in the measured electrical characteristic of the sense elements indicates the presence of a metallic object, through the usual inductive effect, or of an object being heated by the magnetic field, through the thermal effect. Although certain aspects are described herein with respect to detecting foreign objects resting on the top surface of the wireless power transfer structure 200, similar techniques may be used for foreign object detection in other implementations.

Moreover, certain aspects combine capacitive sensing with heat sensing to detect metallic objects using a sensing system comprising a plurality of sense elements and a mediating heat-sensitive material, wherein each sense element comprises an electrically conductive structure. At least a portion of the plurality of sense elements is configured as a capacitive sense element and to have an electrical characteristic that changes in the presence of a metallic object based on a capacitive effect. The mediating heat-sensitive material has a property as described above and changes an electrical characteristic of at least a portion of the plurality of sense elements as the property changes, mediating sensing of the object based on a thermal effect. The electrical characteristic of each of the sense elements may be periodically measured by the measurement circuit 104 in a time multiplexing fashion as discussed in connection with FIG. 4. Measurement outputs of the measurement circuit 104 are evaluated and monitored by the control and evaluation circuit 102 configured to make a decision if the change in the measured electrical characteristic of the sense elements indicates the presence of a metallic object, through the capacitive effect, or of an object being heated by the magnetic field, through the thermal effect.

In an aspect of combined inductive and thermal sensing or combined capacitive and thermal sensing using a mediating heat-sensitive material, the detection circuit 100 may employ the ITS scheme as previously discussed for detecting certain metal objects based on a correlation with the level of magnetic field exposure as previously described. ITS based on a mediating heat-sensitive material may be referred to as indirect ITS (ID-ITS) where the object is detected based on a change in a property of the mediating heat-sensitive material rather than a change in a property of the object itself.

In certain aspects herein, an enclosure of a ground-based wireless power transfer structure is constructed at least partially from a heat-sensitive material that changes at least one of an electrical or a non-electrical characteristic based on a temperature of the material. This allows inductive or capacitive sensors inside the structure to detect foreign objects based on a thermal effect on the heat-sensitive material of the enclosure.

In another aspect, the enclosure may include at least partially a heat-resistant material able to withstand temperatures that foreign objects may reach before a system detects them, which may be as much as 200° C. (473 K) or more. The heat-resistant material may have a melting point of, for example, above 200° C. (473 K). In another aspect, the heat-resistant material may be flame retardant. In a further aspect, the material may have a high autoignition temperature. For example, the heat-resistant material may include one or more of plastics such as nylon resins (e.g., Minlon® or Zytel® resin from Dupont), perfluoroelastomers (e.g., Kalrez® products from Dupont), polymerized siloxanes (e.g., silicone rubber), glass or carbon-fibre reinforced plastics, structural composites (e.g., PyroSic®, PyroKarb™ composites from Pyromeral Systems), a sintered high temperature polymer (e.g., polyimides (PI) such as TECASINT™ from Ensinger), or ceramic matrix composites (CMC) (e.g., glass-ceramics).

In mechanical aspects, the enclosure may include a material that is resistant to mechanical impact, bending, or compressive stress. Such mechanical resistance may protect the wireless power transfer structure from physical damage. Additionally, the material may have an elasticity so as not to be brittle, thereby allowing the material to sag or bend under pressure without breaking (e.g., from a vehicle driving over the wireless power transfer structure). Further, the material may have a low thermal expansion to avoid bulging or deformation due to heat (e.g., from sun irradiation or a foreign object). Moreover, the material may provide good machinability or may be suitable for injection molding.

In an aspect of mass (weight) and other aspects mentioned herein, the enclosure may include an engineering plastic with a relatively low mass density (specific weight) such as a polyamid, (e.g., Durethan® plastic from LANXESS), a Polybutylene terephthalate (PBT) (e.g., Pocan® plastic from LANXESS), and a fiber-reinforced plastic composite (e.g., Tepex® composites from LANXESS).

In a thermal aspect, the enclosure may include a material having a high thermal conductivity to dissipate heat (e.g., heat produced by a foreign object). The heat conductivity may be substantially higher than that of prevalent plastic materials. Alternatively, the enclosure may include a material with a low thermal conductivity (e.g., silica, carbon-carbon composite, fiberglass, etc.). The enclosure may also include a material resistant to long-term ultraviolet (UV) radiation exposure and to chemical substances (e.g., lubricating and diesel oils, gasoline, brake fluid, coolant, solvents, etc.).

In electrical aspects, the enclosure may include a material that is electrically non-conductive such as to not generate substantial eddy currents, and that exhibits low dielectric polarization losses, such as to not generate substantial displacement currents, when exposed to the wireless power electromagnetic field. Furthermore, the material may be non-magnetic or only weakly magnetic such as to not substantially impact the wireless power magnetic field or the magnetic field as generated for sensing foreign objects.

In commercial aspects, the enclosure may include a traditional low-cost material that may not provide properties of a heat-sensitive or heat-resistant material as defined above. Such materials may include one or more of polyethylene (PE), acrylonitrile butadiene styrene (ABS), polyoxymethylene (POM), and fiber-reinforced epoxy material.

The enclosure may combine a material that provides heat sensitivity, heat resistance, or both with any of the other aspects described above.

FIGS. 5A to 5F illustrate examples of respective enclosures 310A to 310F for a wireless power transfer structure (e.g., wireless power transfer structure 200 of FIG. 3). Each of the enclosures 310A to 310F comprises a cover shell 312 and the back plate 206 of FIG. 2 and may be a preferred construction for a ground surface mounted wireless power transfer structure. However, they should not be construed as limited to this application. Certain concepts disclosed in FIGS. 5A to 5F with some adaptions may also be used in a flush-mount or ground-embedded wireless power transfer structure (not shown herein).

As previously described with reference to FIGS. 2 and 3, the enclosures 310A to 310F house the WPT coil 202, the ferrite structure 204, the sense element arrays 107 and 109, and other components. The cover shell 312 is placed over a portion of the wireless power transfer structure that faces a vehicle-based wireless power transfer structure for wirelessly transferring power. For example, the cover shell 312 may be positioned on a portion of the wireless power transfer structure that faces away from the ground (e.g., that is up from the ground) when the wireless power transfer structure is placed on the ground. The back plate 206 is placed below the portion of the wireless power transfer structure that faces the vehicle-based wireless power transfer structure 320 for wirelessly transferring power. For example, the back plate 206 may be disposed on a portion of the wireless power transfer structure that faces toward the ground when the wireless power transfer pad is placed on the ground. The back plate 206 may be metallic (e.g., aluminum), made of plastic, or made of the same material as the cover shell 312. The cover shell 312 may have a size and shape to cover the wireless power transfer structure. As would be understood, the cover shell 312 or back plate 206 may have any suitable size or shape.

In some implementations, the interior of an enclosure is potted using a casting resin or any other suitable material to fill air space. In such implementations, the cover shell 312 may no longer be a separable part after the potting process, having merged with other plastic support structures in the interior of the enclosure. In other implementations (e.g., optimized for a special injection molding process), the cover shell 312 may serve as an insulating and protecting material surrounding the electrical components of the wireless power transfer structure such as the sense element arrays 107 and 109, WPT coil 202, and ferrite structure 204 as illustrated in FIG. 3.

The material used for the cover shell 312 may combine electrical, mechanical, chemical, thermal, and radiation exposure properties as previously described. The cover shell 312 may be resistant to mechanical impact, heat, bending, or compressive stress. Such mechanical strength or heat resistance may protect the wireless power transfer structure from physical damage. In addition, the cover shell 312 may have an elasticity so as not to be brittle, thereby allowing the cover shell 312 to sag or bend under pressure without breaking (e.g., from a vehicle driving over the cover shell 312). Thermal conductivity, in some aspects, may also prevent foreign objects from getting excessively hot because a thermally conductive material absorbs and dissipates heat from a hot foreign object. Therefore, use of a thermally conductive material for the cover shell 312 may prevent a local hot spot from developing on the top surface of the cover shell 312 and consequent damage of portions of the wireless power transfer structure.

Figure 5A:
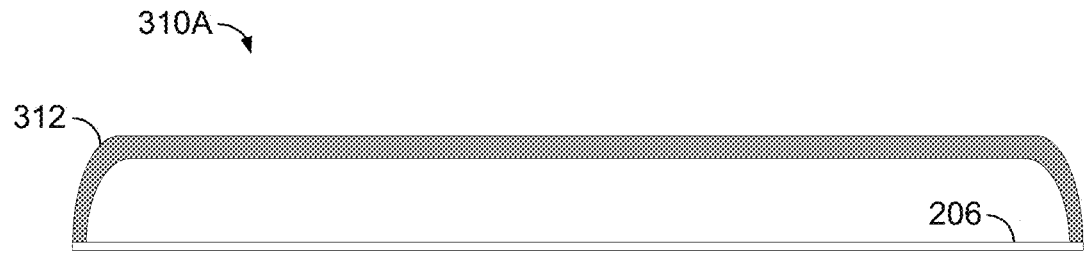
FIGS. 5A-5F show enclosures for a wireless power transfer structure.

FIG. 5A illustrates an example implementation of an enclosure 310A for a wireless power transfer structure. In this implementation, the entire cover shell 312 is made of a heat-sensitive material configured to detect the presence of foreign objects above the top surface of the cover shell 312, as described above, and thus protect the wireless power transfer structure. The heat-sensitive material may combine properties such as a pronounced temperature-dependent electrical characteristic with one or more of a mechanical, chemical, thermal, and radiation exposure property as described above. In particular, it may combine a pronounced temperature-dependent electrical characteristic with heat resistance.

With reference to FIGS. 5B to 5F, the cover shell 312 includes one or more inlays. An inlay may include at least one of a heat-sensitive, heat-resistant, and heat-isolating material. In some implementations, an inlay may be a separate part assembled with the cover shell 312 in a manufacturing process. In other implementations, an inlay may be a defined region of the cover shell 312 created by a special and local treatment of a base material (e.g., plastic) of the cover shell. In further implementations, this region is created by locally adding one or more materials with a desired property (e.g., a heat-sensitive ferrite powder) to the base material during formation (e.g., in an injection molding process).

Figure 5B:
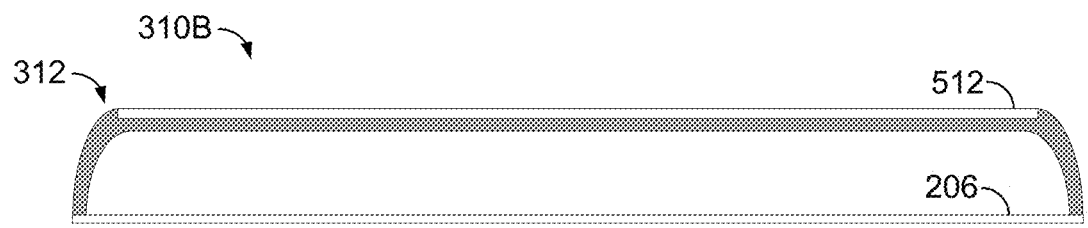

In the example of FIG. 5B, an enclosure 310B is similar to the enclosure 310A, except that the cover shell 312 is not entirely formed of the heat-sensitive material. Instead, as shown, the cover shell 312 includes an inlay 512 at the top surface of the cover shell 312. The inlay 512 may be made of a heat-sensitive material (heat-sensitive inlay). The remaining portion of the cover shell may be made of a non-heat-sensitive material. By reducing the amount of heat-sensitive material used for the cover shell 312, the cost of the enclosure 310B may be reduced without compromising FOD performance. The heat-sensitive inlay 512 may cover only a portion of the top surface of the cover shell 312, or it may cover the entire top surface, as shown. The material used for the heat-sensitive inlay 512 may combine properties such as pronounced temperature-dependent electrical characteristics with one or more of a mechanical, chemical, thermal, and radiation exposure property as previously described. In particular, it may combine a pronounced temperature-dependent electrical characteristic with heat resistance.

Figure 5C:
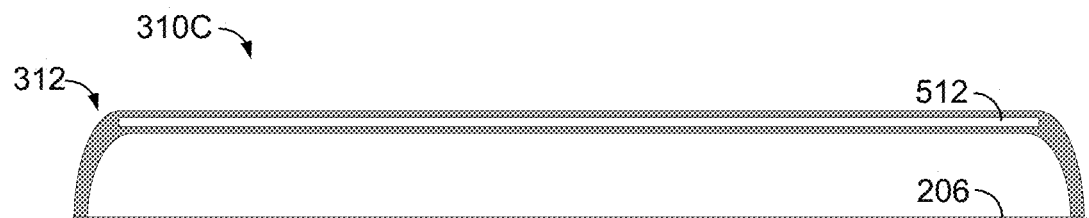

FIG. 5C illustrates a further example of an enclosure 310C. The enclosure 310C is similar to the enclosure 310B, in that it includes the heat-sensitive inlay 512, although the heat-sensitive inlay 512 is embedded in the cover shell 312 instead of being at the top surface of the cover shell 312.

Figure 5D:
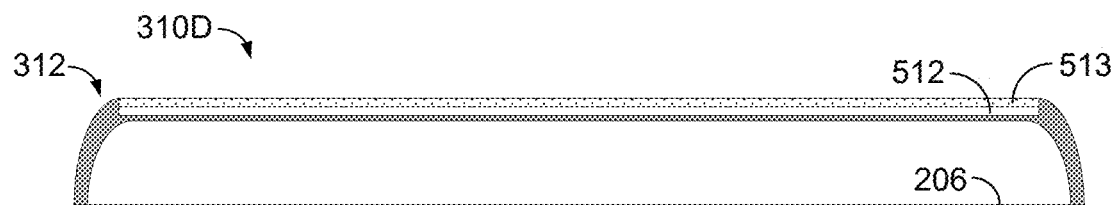

FIG. 5D illustrates yet another example of an enclosure 310D for a wireless power transfer structure. The enclosure 310D is similar to the enclosures 310B and 310C, in that it includes the heat-sensitive inlay 512, but the cover shell 312 further includes a heat-resistant inlay 513. As illustrated in FIG. 5D, the heat-resistant inlay 513 is at the top surface of the cover shell 312, while the heat-sensitive inlay 512 is disposed beneath the heat-resistant inlay 513. In some implementations, the heat-sensitive inlay 512 and the heat-resistant inlay 513 may be adjacent (in physical contact), as shown in FIG. 5D. The material used for the heat-resistant inlay 513 may combine properties such as heat resistance with one or more of a mechanical, chemical, thermal, and radiation exposure property as previously described.

The heat-resistant inlay 513 may include multiple layers, such as a first layer including a first material (e.g., a plastic)

with some heat resistance (e.g., greater than 200° C., 473 K) and a high ignition temperature (e.g., greater than 600° C., 873 K) and a second layer including a highly heat-resistant mesh structure or tissue of a second material, which maintains its structure at high temperature (e.g., greater than 600° C. (873 K)). The inclusion of such multiple layers prevents an object from sinking into the cover shell 312 if the first material starts melting. The second material may be glass or carbon. In another example, the heat-resistant inlay 513 is made of a compound including the first and second material that prevents an object from sinking into the cover shell 312 if the first material starts melting. In a further example, the heat-sensitive inlay 512 is omitted, and the entire remaining portion of the cover shell 312 is made of the heat-sensitive material. In yet another example, the heat-resistant inlay 513 is omitted, and the entire remaining portion of the cover shell 312 is made of the heat-resistant material.

Figure 5E:
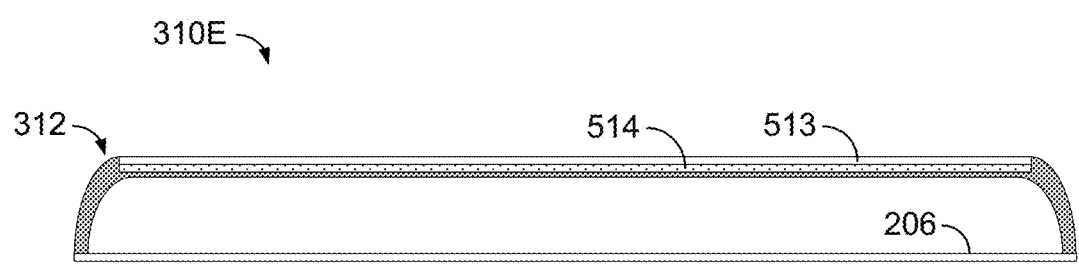

In the example of FIG. 5E, an enclosure 310E is similar to the enclosure 310D, in that it includes a heat-resistant inlay 513 at the top surface as shown, but the cover shell 312 further includes a thermal insulation layer in the form of a heat-insulating inlay 514. The heat-insulating inlay 514 may be made of a material with a low thermal conductivity as previously described. The heat-insulating inlay 514 may protect the wireless transfer structure from heat (e.g., generated by a foreign object) and consequent damage. For example, although the heat-resistant inlay 513 may prevent a hot object from physically contacting exposed components of the wireless power transfer structure housed in the enclosure 310E, in some aspects heat may still pass through the heat-resistant inlay 513 to those components of the wireless power transfer structure, causing damage. Accordingly, the heat-insulating inlay 514 may prevent or mitigate heat generated by the foreign object from reaching exposed components in the interior of the enclosure 310E of the wireless power transfer structure. As illustrated in FIG. 5E, the heat-insulating inlay 514 may be disposed adjacent to (e.g., below) the heat-resistant inlay 513.

In another example, the heat-resistant inlay 513 is omitted and the entire remaining portion of the cover shell 312 is made of heat-resistant material, with the heat-insulating inlay 514 embedded in the cover shell 312.

Using a heat-resistant inlay 513 in combination with a heat-insulating inlay 514 may sufficiently protect the cover shell 312 from damage caused by a hot object resting on its top surface for extended periods (e.g., several hours), and thus thermal sensing (e.g., using a heat-sensitive material) may not be required.

Figure 5F:
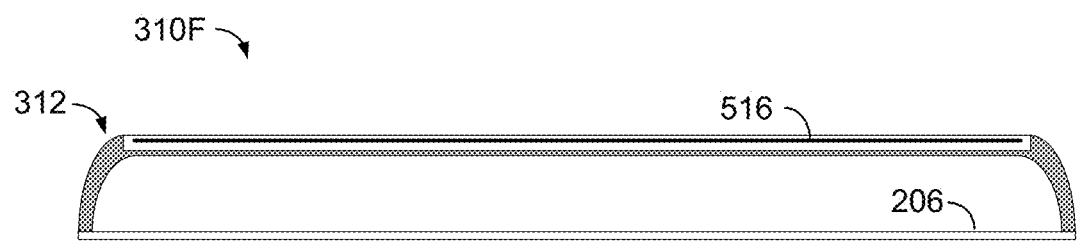

In the example of FIG. 5F, an enclosure 310F is similar to any of the enclosures 310A to 310E, and may include heat-sensitive, heat-resistant, or heat-insulating inlays (not shown). The cover shell 312 further includes an arrangement 516 of one or more sense elements configured for detecting foreign objects. In some implementations, the arrangement 516 includes at least one sense element array such as one or both of the sense element arrays 107 and 109 of FIG. 1. The arrangement 516 may be electrically coupled to the measurement circuit or some circuit configured to detect foreign objects near the cover shell 312, such as by detecting changes of an electrical characteristic of the one or more sense elements.

FIGS. 6A to 6D are schematic diagrams illustrating example implementations of a sensing system 600A to 600D, respectively, each configured for combined inductive and thermal sensing. Each of the example sensing systems 600A to 600D includes a sense element 610 and a planar heat-sensitive structure 602 (e.g., a sheet) made of a mediating heat-sensitive material and disposed in contact or close proximity to the sense element 610. For purposes of illustration, FIGS. 6A to 6D only show a single sense element 610 and a cutout of the heat-sensitive structure 602. In some implementations, the sense element 610 or a portion thereof corresponds to an inductive sense element (e.g., one of inductive sense elements 107a-107n) with reference to FIG. 1 and the heat-sensitive structure 602 may correspond to the cover shell 312 or inlay 512 with reference to FIGS. 5A to 5D. Each sense element 610 includes an electrically conductive planar structure consisting of a pair of sense coils 611 and 612 providing terminals 1a, 1b and 2a, 2b, respectively, to interface to the additional elements of a sense circuit (e.g., one of the sense circuits 106a-106n) as previously discussed in connection with FIG. 1. In some conceptions or implementations, terminals 1a, 1b and 2a, 2b define the reference plane to which electrical characteristics of a sense element 610 refer. However, in other conceptions or implementations, an electrical characteristic includes the entirety of the sense circuit and is measured at the terminals of the sense circuit (e.g., by the measurement circuit 104 as illustrated in FIG. 4). FIGS. 6A to 6D also show at the top right a cross-sectional view (a vertical cut with respect to the drawing plane) of a small portion of the planar heat-sensitive structure 602 and a cross-section of one section of the coils 611 and 612.

Figure 6A:
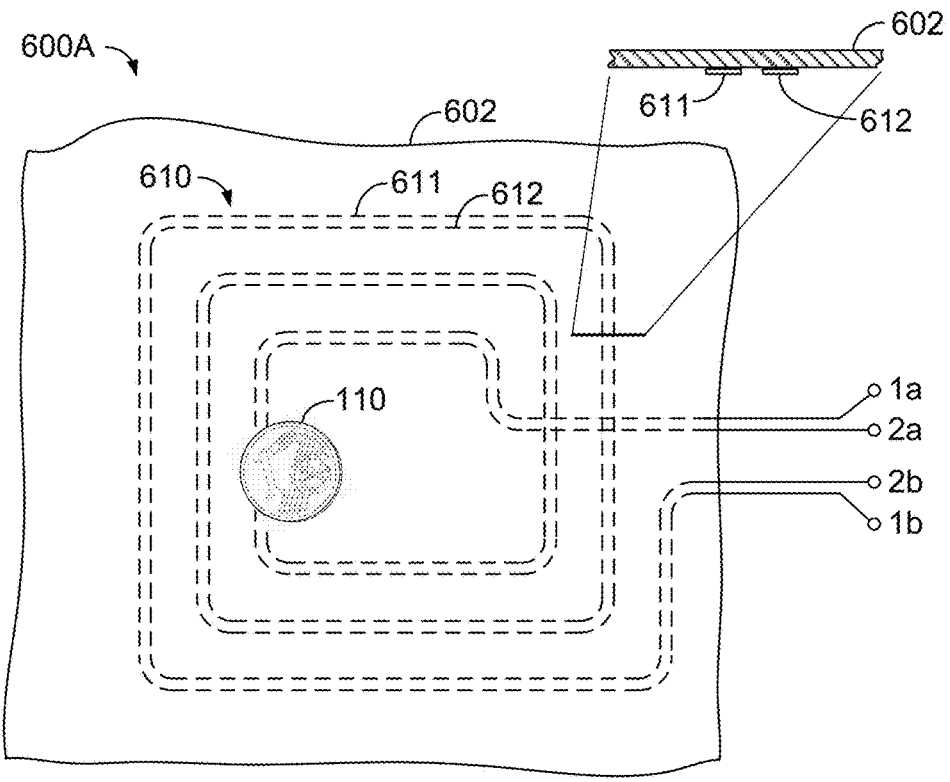
FIGS. 6A-6D each show a combined inductive and thermal sensing system.
Figure 6B:
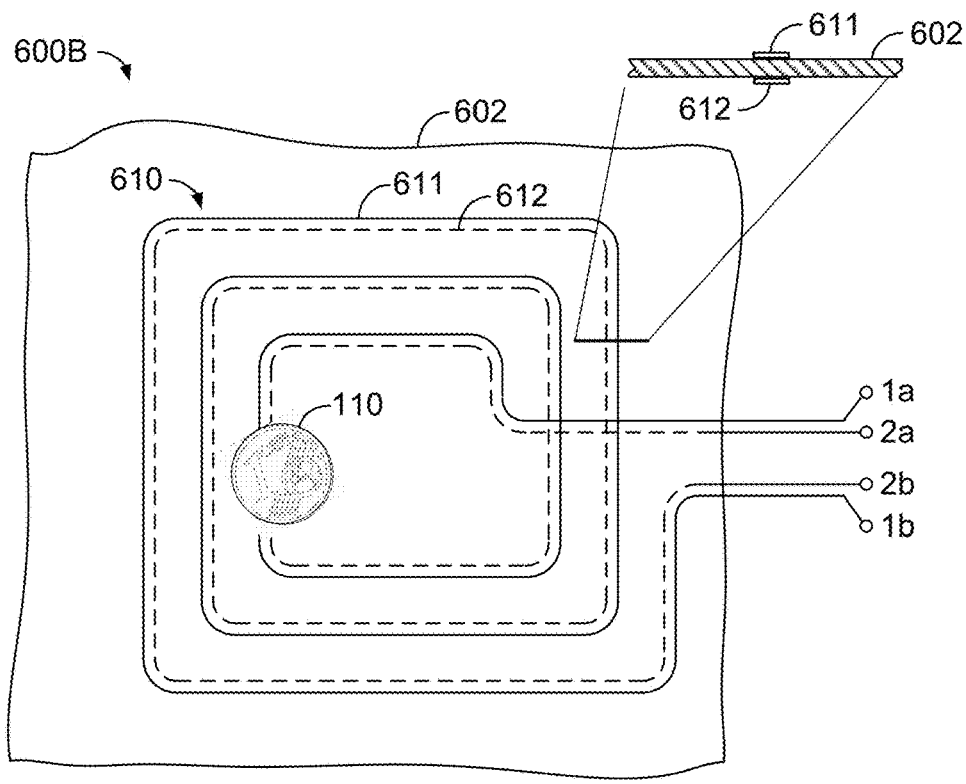
Figure 6C:
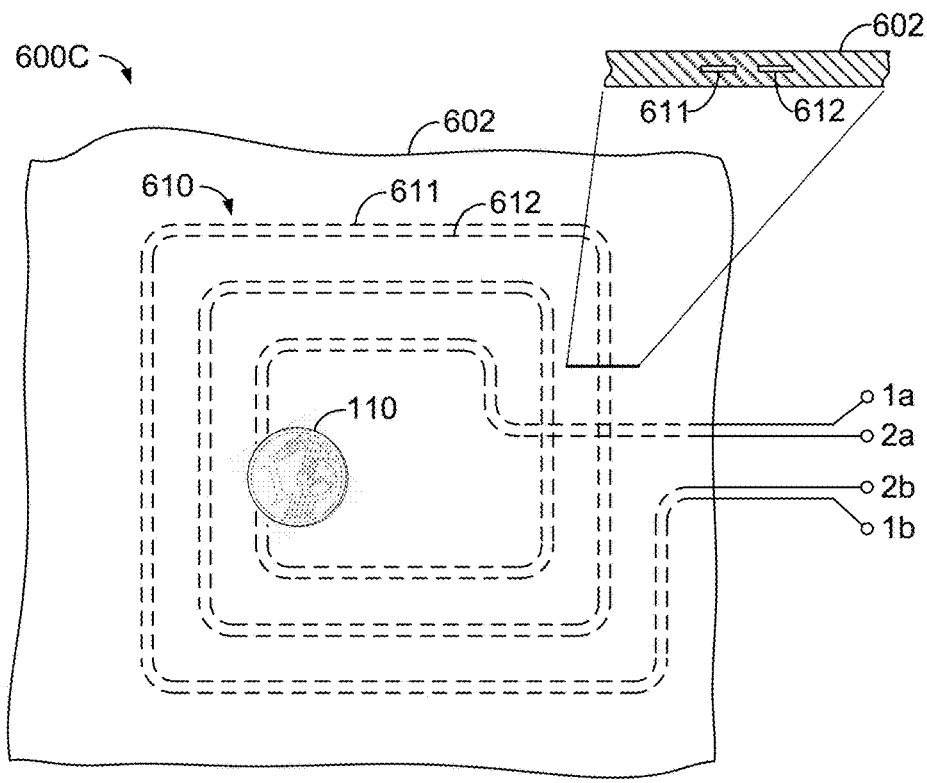
Figure 6D:
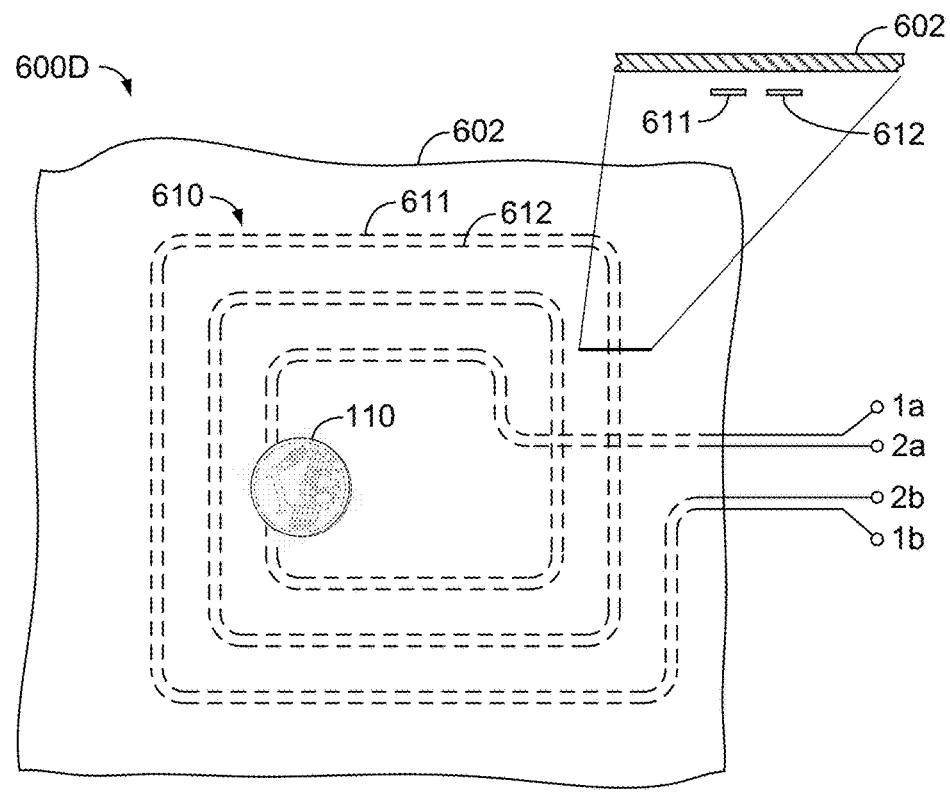

FIG. 6A illustrates an example implementation of a sensing system 600A, where both sense coils 611 and 612 are disposed at the bottom surface of the heat-sensitive structure 602 and galvanically contacted to the heat-sensitive structure 602. The galvanic contact may extend over the full conductor length of the coil windings. FIG. 6B illustrates an example implementation of a sensing system 600B, where sense coils 611 and 612 are disposed opposite each other on different sides of the heat-sensitive structure 602 and galvanically contacted to the heat-sensitive structure 602. FIG. 6C illustrates an example implementation of a sensing system 600C, where sense coils 611 and 612 are embedded in the heat-sensitive structure 602 and galvanically contacted to the heat-sensitive structure 602. FIG. 6D illustrates an example implementation of a sensing system 600D, where sense coils 611 and 612 are disposed beneath the heat-sensitive structure 602 but physically separated (galvanically isolated) from the heat-sensitive structure 602.

In a general example with reference to FIGS. 6A to 6D, multiple electrical characteristics can be defined and measured between the terminals of the sense element 610 as known from a 4-pole network. More specifically, a one-port self-electrical characteristic between terminals 1a and 1b and between terminals 2a and 2b can be defined for sense coils 611 and 612, respectively. Further, a one-port mutual-electrical characteristic can be defined between the various pairs of terminals 1a and 2a, 1b and 2b, 1a and 2b, and 1b and 2a. Moreover, a two-port mutual-electrical characteristic may be defined between terminals 1a, 1b and terminals 2a, 2b. In some implementations, the measured fundamental electrical characteristic is one or more of an impedance as measured at an operating frequency (e.g., the sense frequency) of the detection circuit 100, a resistance as measured at DC, an impulse response in a current as measured when applying a voltage pulse, and a current or voltage response of another voltage or current waveform, respectively. These fundamental characteristics may principally apply to both self- and mutual-electrical characteristics.

A change in one or more of the measured electrical characteristics (e.g., a self-impedance, a mutual impedance) may be indicative of an object. The change may be defined as a difference to a reference value as determined in absence of any object and may be used to determine a presence of a foreign object. More specifically, a change in one or more of the measured electrical characteristics may be produced by a presence of an object based on one or more of an inductive effect and a thermal effect. In particular, a metal object in thermal contact with the heat-sensitive structure 602 and inductively heated by a strong alternating magnetic field (e.g., as generated by the wireless power transfer structure 200) may cause a property of the heat-sensitive structure 602 to change. This change may in turn cause a change in one or more of the measured electrical characteristics of the sense element 610 disposed adjacent or proximate to the heat-sensitive structure 602 acting as a mediating material.

In an example implementation referring to FIGS. 6A to 6C, the heat-sensitive structure 602 is configured to have a DC resistance (e.g., a sheet DC resistance in Ω/square) that varies as a function of temperature (examples described above). In this implementation, a local change of the DC resistance caused by a heating object also is expected to cause a change in a DC resistance as measured (e.g., between terminal 1a and 2a) based on the thermal effect. On the other hand, a metal object proximate to the sense element 610 may cause a change in the self-impedances and mutual impedances as measured between terminals 1a, 1b, 2a, and 2b due to the inductive effect. However, an increase of the DC resistance of the heat-sensitive structure 602 may also be apparent in a change in the self- and mutual impedances as measured at the sense frequency (e.g., high frequency) between terminals 1a, 1b, 2a, and 2b of the sense element 610.

In another example implementation referring to FIGS. 6A to 6C, the heat-sensitive structure 602 is substantially an electrical insulator configured to have a DC conductivity (e.g., a sheet DC conductivity in Siemens/m/square) that substantially increases as a temperature exceeds a threshold (examples described above). In this implementation, a local increase of the conductivity caused by a heating object also is expected to cause a decrease of a DC insulation resistance as measured (e.g., between terminal 1a and 2a) based on the thermal effect. However, an increase of the DC conductivity of the heat-sensitive structure 602 may also be apparent in a change in the self- and mutual impedances as measured at the sense frequency (e.g., high frequency) between terminals 1a, 1b, 2a, and 2b of the sense element 610.

In a further example implementation referring to any of FIGS. 6A to 6D, the heat-sensitive structure 602 is configured to have an impedance (e.g., a sheet impedance or surface impedance in Ω/square) with real (resistive) and imaginary (reactive) parts that varies as a function of temperature. This may be a material that varies a sheet inductance or a sheet capacitance (e.g., due to a magnetic permeability or an electrical permittivity that varies as a function of temperature (examples described above)). In this implementation, a local change of the sheet impedance caused by a heating object may also cause a change in an impedance as measured between any pairs of terminals 1a, 2a, 1b, and 2b based on the thermal effect and in addition to the inductive effect. It may be appreciated that a change in an impedance based on both the thermal and inductive effects would be expected in the implementation of FIG. 6D using a heat-sensitive structure 602 that is not in physical contact with the sense element 610. This may be true for a heat-sensitive material configured to vary any of a sheet resistance or a sheet impedance as a function of temperature.

In yet another example implementation referring to FIGS. 6A to 6D, the sense element 610 comprises only one sense coil (e.g., sense coil 611) and an impedance is measured between terminals 1a and 1b for determining the presence of an object (e.g., object 110) based on one or more of an inductive and a thermal effect.

In an example implementation of a sensing system based on one or more of a capacitive and a thermal effect (not shown herein), the sense element 610 is replaced by a capacitive sense element (e.g., one of capacitive sense elements 109a-109n) comprising two electrodes, each providing a terminal, and an impedance is measured between the terminal of the first electrode and the terminal of the second electrode for determining the presence of an object based on one or more of an inductive and a thermal effect.

The implementations as illustrated in FIGS. 6A to 6D should be construed as exemplary and non-limiting. They do not represent the only implementations of a combined inductive and heat sensing FOD. For example, the heat-sensitive structure 602 may be omitted. Instead, the electrically conductive structure of the sense element 610 may include the heat-sensitive material (e.g., a heat-sensitive electrical conductor). The heat-sensitive electrical conductor may be configured to substantially increase its resistance if the temperature rises above a threshold (e.g., 100° C., 373 K) as previously discussed. The sense elements may be embedded in the cover shell 312 of FIG. 3 (e.g., a few millimeters below its top surface) to minimize thermal resistance of heat flow from the object to the sense element.

As described above with reference to FIG. 4, the sensing system may be coupled to a controller (e.g., one comprising the measurement circuit 104 and the control and evaluation circuit 102 of FIG. 4). The controller may be configured to measure an electrical characteristic of the sense element and to control the wireless power transfer of the WPT system (e.g., via control output indicated in FIG. 4). For example, in certain aspects, if a change in the measured electrical characteristic satisfies a threshold or another defined criterion indicative of a presence of a foreign object by either the inductive or thermal effect mediated by the mediating heat-sensitive structure, the controller determines a foreign object is present and takes appropriate action.

In some aspects, once the presence of a foreign object is detected by either the inductive or thermal effect as described above, the controller or the WPT system may take one or more actions. For instance, the system may go into a low power mode, reduce power, turn off, or issue alerts prompting a user to remove the object.

Further, in some aspects, the detection of a foreign object (e.g., object 110) based on the thermal effect may be made more reliable by correlating the change in a measured characteristics of a sense element 610, as described above for the ITS scheme in connection with FIG. 4, with a level of the alternating magnetic field as generated by one or more of the ground-based and vehicle-based wireless power transfer structures (e.g., 200 and 320 of FIG. 3).

In some other aspects, the detection of a foreign object may be made more reliable by correlating a change in a measured electrical characteristics of a sense element 610 with an output of another foreign object detector (e.g., based on microwave radar sensing, infrared sensing, visual light sensing, e.g. using a vehicle underbody mounted camera or a ground-based camera, etc.).

Figure 7:
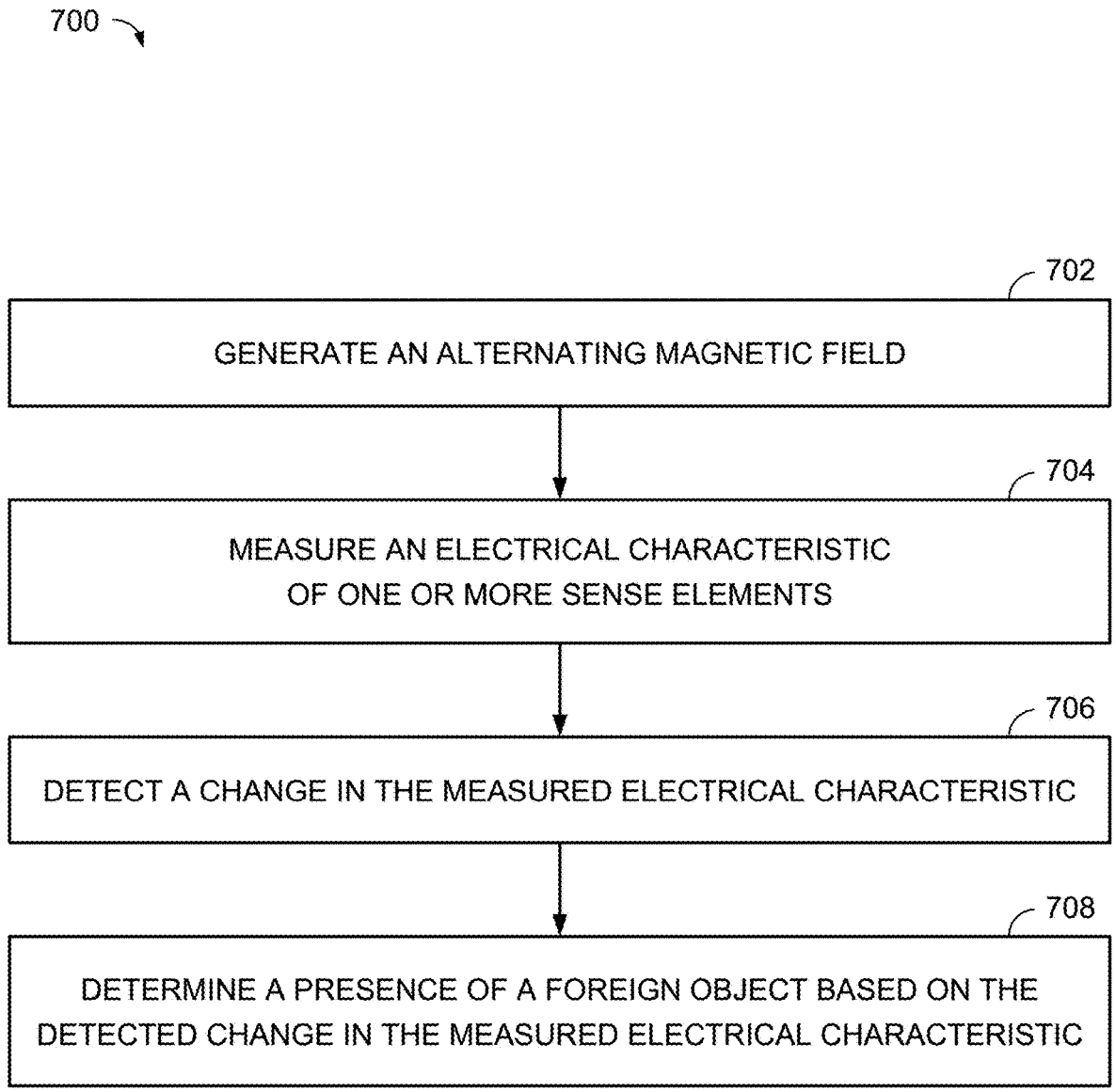
FIG. 7 illustrates example operations for performing combined inductive sensing and thermal sensing in a foreign object detection system.

In a further aspect, FIG. 7 illustrates example operations for performing combined inductive sensing and thermal sensing for detecting a foreign object. In certain aspects, operations 700 may be performed by a controller.

Operations 700 begin at operation 702, where an alternating magnetic field is generated in a wireless power transfer system comprising a sensing system comprising one or more sense elements and a mediating heat-sensitive material configured for detecting a foreign object based on one or more of an inductive and a thermal effect. At 704, an electrical characteristic of the one or more sense elements is measured. At 706, a change in the measured electrical characteristic of the one or more sense elements is detected, where the change is caused by one or more of the inductive effect and the thermal effect mediated by the mediating heat-sensitive material, which is configured to vary a property as a function of a temperature when heated by the foreign object exposed to the alternating magnetic field and thereby to change the electrical characteristic of the one or more sense elements. Finally, at 708, the presence of the foreign object is determined based on the detected change in the measured electrical characteristic.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The various illustrative operations, logical blocks, modules and circuits described in connection with the present disclosure may be implemented or performed with a general-purpose processor, a digital signal processor (DSP), an application-specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

It is to be understood that the claims are not limited to the precise configuration and components illustrated above. Various modifications, changes, and variations may be made in the arrangement, operation and details of the methods and apparatus described above without departing from the scope of the claims.

What is claimed is:

1. An apparatus for detecting a presence of a foreign object in an inductive wireless power transfer system, the apparatus comprising:
   a sensing system configured to sense the foreign object based on one or more of an inductive effect and a thermal effect, the sensing system including:
      a sense element having an electrical characteristic, the sense element being configured to sense the foreign object based on the inductive effect related to a first alternating magnetic field; and
      a mediating heat-sensitive material coupled to, but electrically separate from, the sense element, wherein the mediating heat-sensitive material has a property that varies as a function of temperature when heated by the foreign object exposed to a second alternating magnetic field generated by the inductive wireless power transfer system, wherein the mediating heat-sensitive material changes the electrical characteristic of the sense element as a function of the property; and
   a controller coupled to the sensing system, the controller configured to:
      measure the electrical characteristic of the sense element; and
      determine the presence of the foreign object based on the change in the measured electrical characteristic caused by at least one of the inductive effect and the thermal effect through the mediating heat-sensitive material.

2. The apparatus of claim 1, wherein the property of the mediating heat-sensitive material comprises one or more of a resistivity, a conductivity, an impedance, a capacitance, an inductance, a magnetic permeability, and an electric permittivity.

3. The apparatus of claim 1, wherein the mediating heat-sensitive material is configured to substantially change the property as the temperature of the mediating heat-sensitive material passes a threshold that is higher than 373 Kelvin.

4. The apparatus of claim 3, wherein the mediating heat-sensitive material includes one or more of a negative temperature coefficient (NTC) resistance material, a positive temperature coefficient (PTC) resistance material, a dielectric material with a low Curie point, and a ferrite material with a low Curie point.

5. The apparatus of claim 1, wherein the sense element comprises one or more turns of an electrical conductor.

6. The apparatus of claim 5, wherein the sense element is implemented on a printed circuit board.

7. The apparatus of claim 1, wherein the sense element is embedded in a layer also comprising the mediating heat-sensitive material.

8. The apparatus of claim 1, wherein the heat-sensitive material is in a first layer different from a second layer comprising the sense element.

9. The apparatus of claim 1, wherein the sensing system comprises an array of sense elements, and the mediating heat-sensitive material is associated with at least one sense element of the array.

10. The apparatus of claim 1, wherein the electrical characteristic measured by the controller comprises one or more of an impedance, a transimpedance, a direct current (DC) resistance, a voltage, a current, an induced voltage, an impulse response, and a response of another waveform.

11. The apparatus of claim 1, wherein the controller is configured to determine the presence of the foreign object by correlating the measured electrical characteristic with a level of the second alternating magnetic field generated by the inductive wireless power transfer system.

12. The apparatus of claim 11, wherein correlating the measured electrical characteristic with the level of the second alternating magnetic field comprises at least one of inductive thermal sensing (ITS), inductive ferromagnetic sensing (IFS), or inductive motion sensing (IMS).

13. The apparatus of claim 1, further comprising a heat-resistant material configured to protect the sensing system against damage from heat from the foreign object.

14. The apparatus of claim 13, wherein the heat-resistant material constitutes at least a portion of an enclosure of the wireless power transfer system.

15. The apparatus of claim 13, wherein the heat-resistant material is in a first layer exposed to an exterior of the apparatus, and the heat-sensitive material is in a second layer covered by the first layer.

16. The apparatus of claim 13, wherein the heat-resistant material is configured to have a melting point higher than 473 Kelvin and to withstand a temperature reached by the foreign object higher than 473 Kelvin without losing structural integrity.

17. A method of detecting a presence of a foreign object in an inductive wireless power transfer system based on one or more of an inductive effect and a thermal effect, the method comprising:
measuring an electrical characteristic of a sense element sensitive to the presence of the foreign object based on an inductive effect related to a first alternating magnetic field; and
while a second alternating magnetic field is being generated by the inductive wireless power transfer system:
measuring the electrical characteristic of the sense element;
determining that the electrical characteristic has changed due to the thermal effect when the electrical characteristic has changed in a manner that indicates that the change was due to a property of a mediating heat-sensitive material coupled to, but electrically separate from, the sense element, the property varying as a function of temperature when the mediating heat-sensitive material is heated by the foreign object exposed to the second alternating magnetic field; and
determining the presence of the foreign object based on the change in the measured electrical characteristic caused by at least one of the inductive effect or the thermal effect through the mediating heat-sensitive material.

18. The method of claim 17, wherein measuring the electrical characteristic of the sense element includes measuring one or more of an impedance, a transimpedance, a direct current (DC) resistance, a voltage, a current, an induced voltage, an impulse response, and a response of another waveform.

19. The method of claim 17, wherein determining the presence of the foreign object includes correlating the measured electrical characteristic with a level of the second alternating magnetic field generated by the inductive wireless power transfer system.

20. The method of claim 19, wherein correlating the measured electrical characteristic with the level of the second alternating magnetic field comprises at least one of inductive thermal sensing (ITS), inductive ferromagnetic sensing (IFS), or inductive motion sensing (IMS).

* * * * *